US011423349B2

(12) United States Patent
Boye et al.

(10) Patent No.: US 11,423,349 B2
(45) Date of Patent: Aug. 23, 2022

(54) PREDICTIVE ANALYTICS FOR TRANSPORT SERVICES

(71) Applicant: RunBuggy OMI, Inc., Ontario, CA (US)

(72) Inventors: Bryan Mark Boye, Ontario, CA (US); Mark Edward Hoye, Ontario, CA (US)

(73) Assignee: RunBuggy OMI, Inc., Ontario, CA (US)

( * ) Notice: Subject to any disclaimer, the term of this patent is extended or adjusted under 35 U.S.C. 154(b) by 902 days.

(21) Appl. No.: 15/721,023

(22) Filed: Sep. 29, 2017

(65) Prior Publication Data
US 2018/0096300 A1  Apr. 5, 2018

Related U.S. Application Data

(60) Provisional application No. 62/402,935, filed on Sep. 30, 2016.

(51) Int. Cl.
*G06Q 10/08* (2012.01)
*G06Q 30/02* (2012.01)
*G06Q 10/06* (2012.01)

(52) U.S. Cl.
CPC ..... *G06Q 10/08355* (2013.01); *G06Q 10/067* (2013.01); *G06Q 30/0283* (2013.01)

(58) Field of Classification Search
CPC ........... G06Q 10/08355; G06Q 10/067; G06Q 30/0283
USPC ......................................................... 705/338
See application file for complete search history.

(56) References Cited

U.S. PATENT DOCUMENTS

| 2008/0125965 A1* | 5/2008 | Carani ...................... G08G 1/13 340/539.13 |
| 2010/0114790 A1* | 5/2010 | Strimling ............. G06Q 10/083 705/330 |
| 2017/0132532 A1* | 5/2017 | Myers ................ G06Q 10/1097 |
| 2018/0060809 A1* | 3/2018 | Seaman ................ G06Q 10/08 |

OTHER PUBLICATIONS

"Planning City-Wide Package Delivery Paths Leveraging the Crowd of Taxis" Published by IEEE (Year: 2016).*

* cited by examiner

*Primary Examiner* — Zeina Elchanti
(74) *Attorney, Agent, or Firm* — ArentFox Schiff LLP

(57) ABSTRACT

Example implementations are directed to methods and systems for predictive analytics for transport services that utilize vehicle, order, and route parameters to optimize matching using demand and suitability calculations. According to some example implementation, options for marshaling a route can be predicted and scored against other options in order to efficiently match one or more suitable transporters.

20 Claims, 37 Drawing Sheets

300

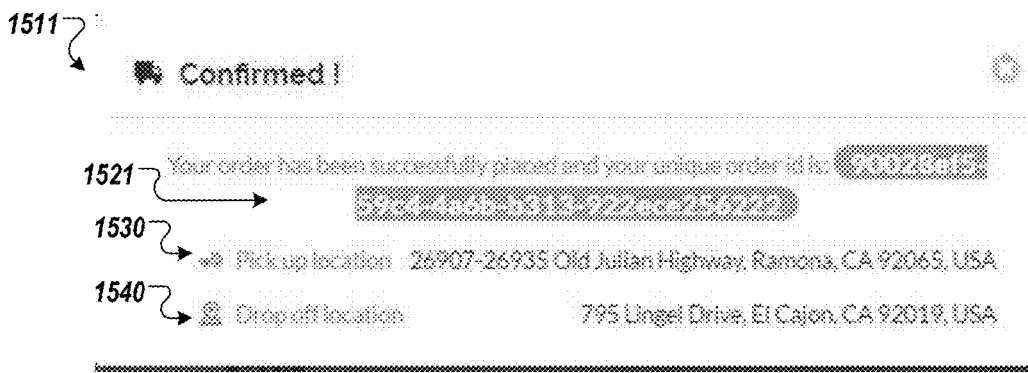
FIG. 15

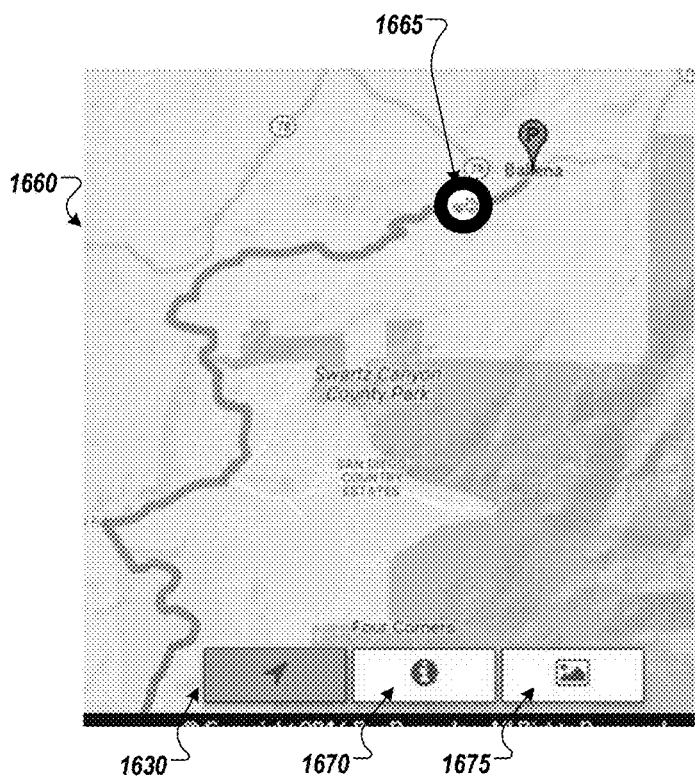
FIG. 16

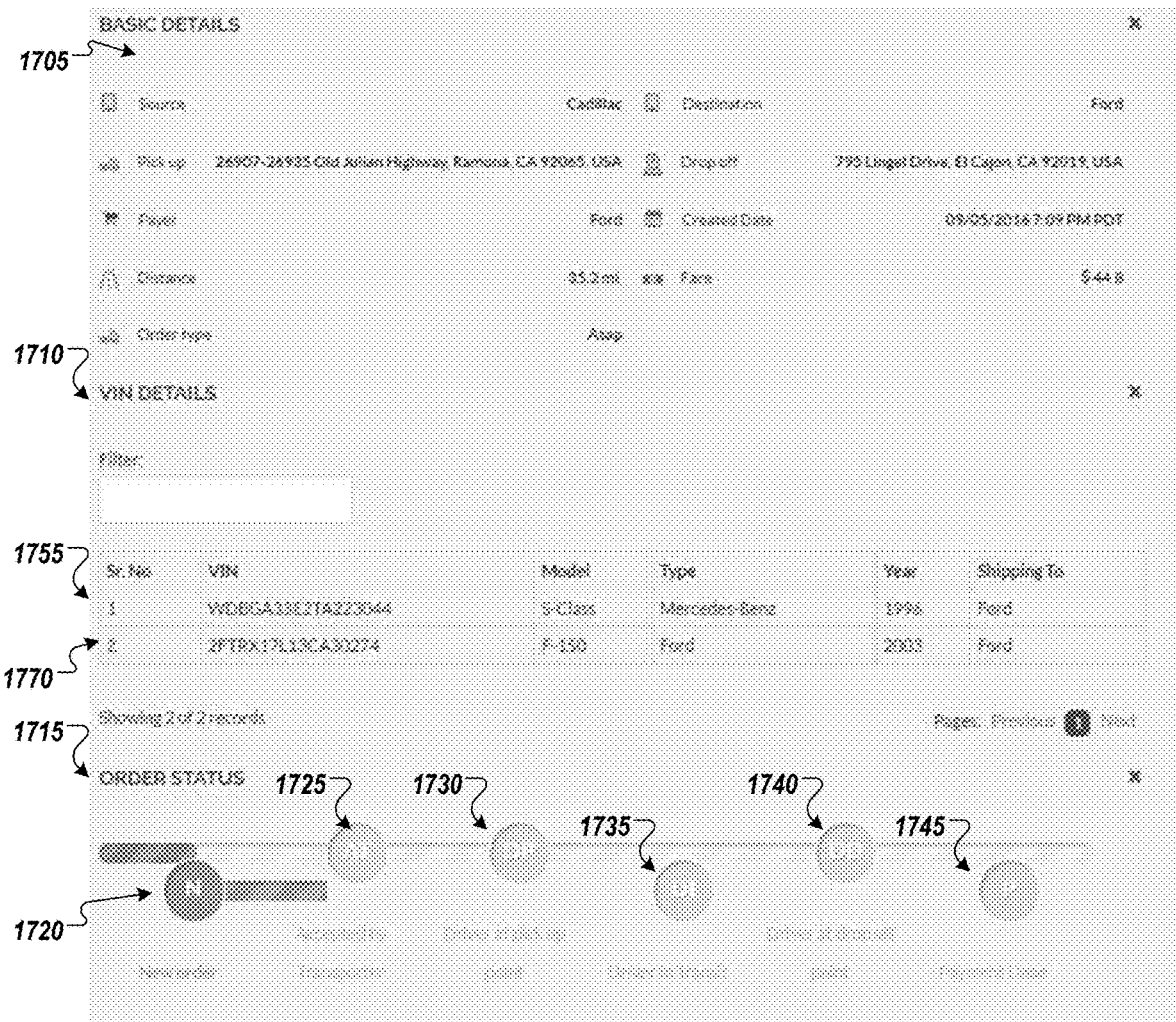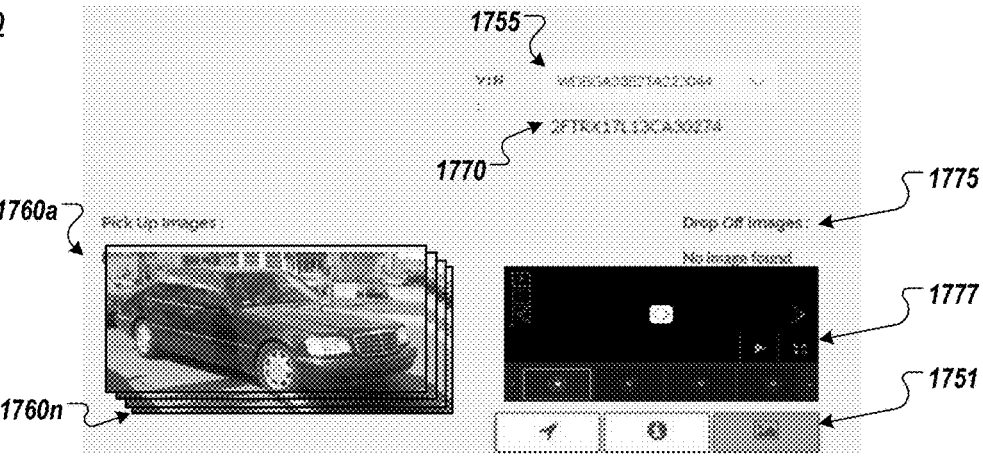
FIG. 17

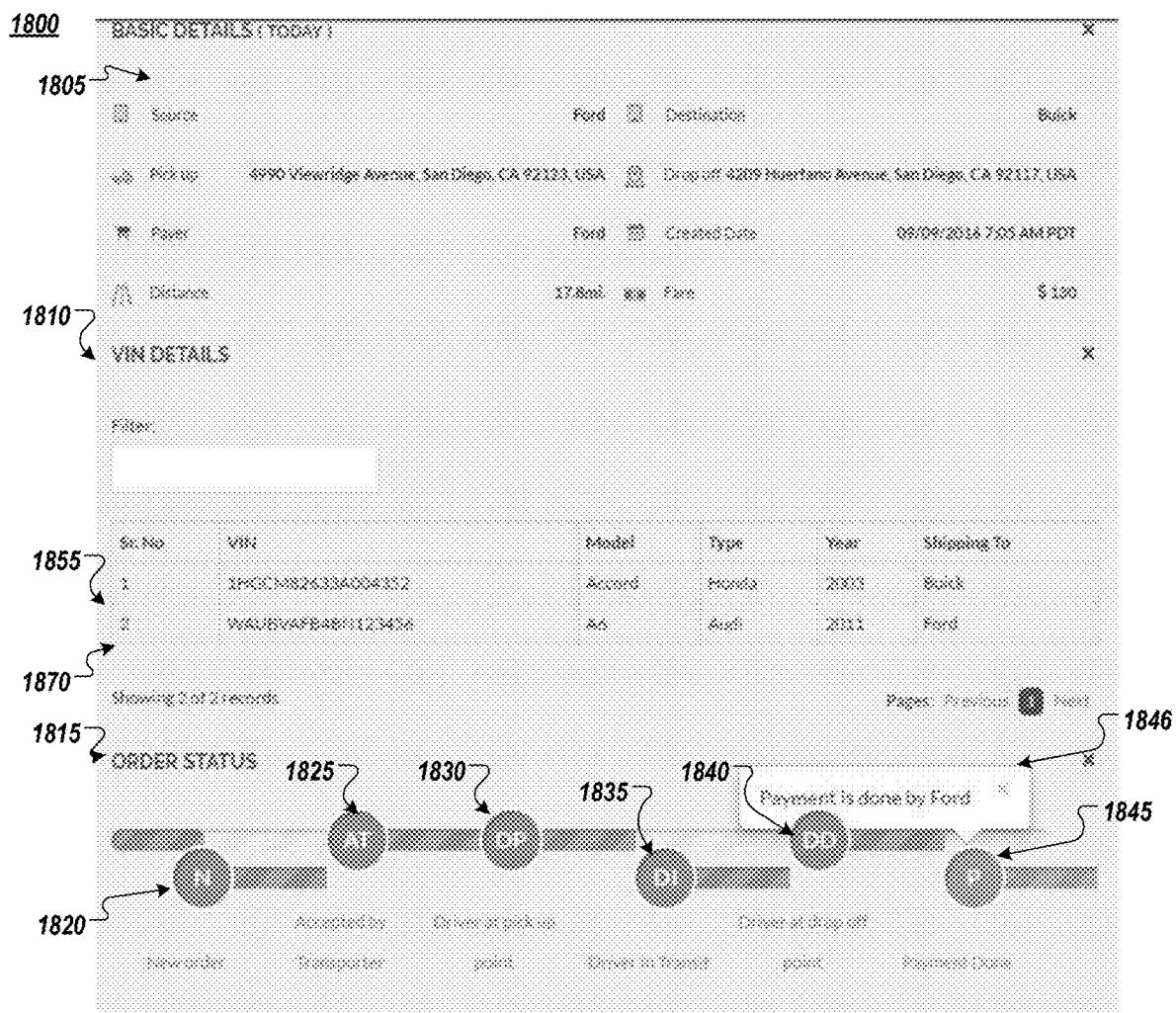
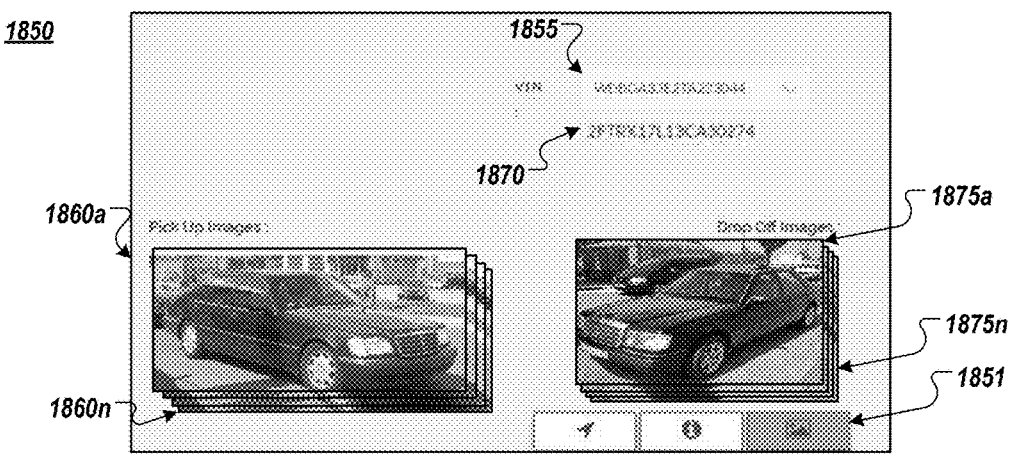
FIG. 18

BUSINESS DETAILS

BUSINESS NAME

AZ transporters

BUSINESS TAX ID

Enter your 9-digit business tax id

BUSINESS EMAIL nakul.dixar@brix.in

BUSINESS ADDRESS

| STREET | STATE |
|---|---|
| baker street | CA |

| CITY | ZIP CODE |
|---|---|
| SD | 91010 |

_2320_

BANK ACCOUNT DETAILS

ROUTING NUMBER

Enter routing number

ACCOUNT NUMBER

Enter bank account number

_2330_

BROWSE IDENTITY DOCUMENT...

Choose File   No file chosen

_2340_

2400

2410 Entity: TRANSPORTER

Name: Search by name

2440 Approval: BY DOCUMENT UPL...

2420 Hernandez Hauling
Address: 4036 Federal Blvd San Diego California 92108

2430 0 of 3 are verified — VIEW DOCUMENTS

Lighting Messenger Express
Address: 2173 Cactus Road San Diego California 92154

0 of 3 are verified — VIEW DOCUMENTS

2450

2460 Direct Approval: ☑
Comment: (This comment will be shown to the entity as a reason of approval.)

SUBMIT

———————————— OR ————————————

2470 Required documents for verification

2480 Certificate of Operating Authority
Not uploaded

2485 Certificate of Insurance
Not uploaded

2490 W9
Not uploaded

*2763*
ADD NEW DRIVER

*2762*
Add New Truck    Add New Driver    Assign Truck To Driver

USERNAME

FIRST NAME

LAST NAME

CONTACT NUMBER

*2769*
IDENTITY DOCUMENT

SAVE    CANCEL

*2770*

*2771*
ASSIGN TRUCK TO DRIVER

*2772*
Add New Truck    Add New Driver    Assign Truck To Driver

*2719* Drivers      Trucks

Albert Smith      Megatron

*2779*
ASSIGN    CANCEL

Ironhide
Barricade

3100
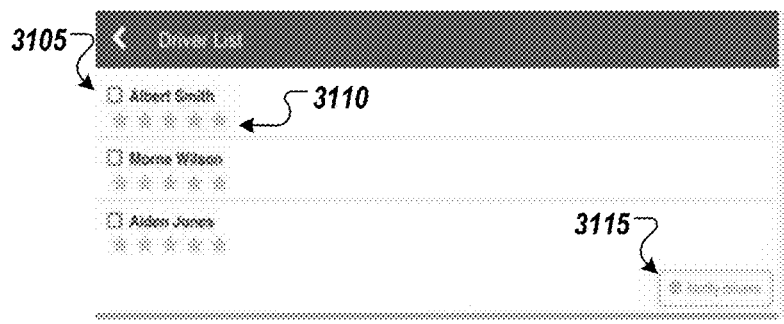
3120
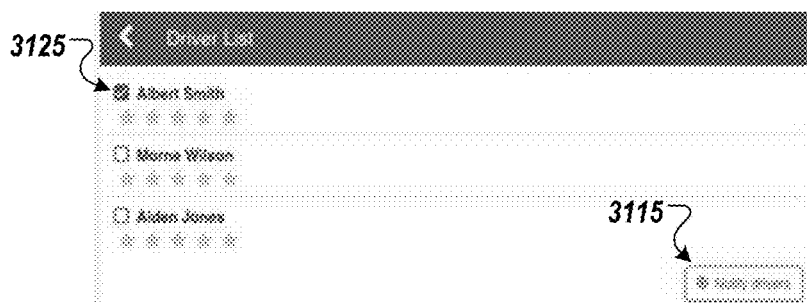
3150
FIG. 31

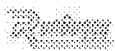

Invoice

Driver Name: Albert Smith

Truck Number:

Order Id:
ecad34be-21d4-4d45-b18d-ebac387bb738

Invoice Date: 08/15/2018 11:43 PM UTC

Invoice Number:
ecad34be-21d4-4d45-b18d-ebac387bb738

| ORIGIN | | DESTINATION | |
|---|---|---|---|
| Name: | Buick | Name: | Ford |
| Business Address: | 4209 Huerfano Avenue, San Diego, CA 92117, USA | Business Address: | 4990 Viewridge Avenue, San Diego, CA 92123, USA |
| Parking Address: | 4209 Huerfano Avenue, San Diego, CA 92117, USA | Parking Address: | 4990 Viewridge Avenue, San Diego, CA 92123, USA |
| Pickup date: | 08/06/2018 9:35 PM UTC | Drop off date: | 08/06/2018 9:29 PM UTC |

VEHICLE DETAILS

| VIN | WAUSVAF848N123456 |
|---|---|
| Model | A8 |
| Type | Audi |
| Year | 2011 |
| Shipping To | Ford |

| Total Distance Covered: 9.9 mi | Charges: | 1. Total Charges: $70.0<br>2. Runbuggy Charges: $10 |
|---|---|---|

FIG. 32

PREDICTIVE ANALYTICS FOR TRANSPORT SERVICES

RELATED APPLICATION

The present application claims priority to U.S. Provisional Application No. 62/402,935 filed Sep. 30, 2016, which is hereby incorporated by reference in its entirety.

TECHNICAL FIELD

The present disclosure relates to a predictive modeling, and more specifically, to systems and methods for predictive modeling in real-time transporter services.

BACKGROUND

Vehicles are frequently shipped near and far to complete a sale or adjust dealer inventory. Conventionally, shippers pay transport brokers to negotiate with drivers and collect a transport fee for arranging pickup and delivery. Shipping vehicles across different regions traditionally requires brokers to find a driver or establish predetermined legs of a route to piece together. Transport brokers wait to receive a shipping request and then employ message boards, call centers, email lists, and hotlines to elicit bids from transporters to find the first available match. The time, cost, and success of delivery is dependent on the broker finding an available match or managing a chain of drivers pieced together by the first available.

In some cases, a shipper may frequently transfers vehicles to other dealers or auctioneers within a geographic area in irregular quantities and chaotic times. Further, shipping vehicles within a geographic area typically does not support the cost of conventional transport broker fees. Dealers are generally left to establishing ad-hoc arrangements with transports for shipping vehicles within the geographic area.

Unlike traditional inventory management, people moving, or package delivery, vehicle transport services involve unique dependencies, such as logistical and regulatory constraints, that conventional management tools fail to optimize.

BRIEF DESCRIPTION OF THE DRAWINGS

FIG. 15 illustrates example order processing interfaces in accordance with some example implementations of the present application.

FIG. 16 illustrates example tracking interfaces in accordance with some example implementations of the present application.

FIG. 17 illustrates example order detail interfaces in accordance with some example implementations of the present application.

FIG. 18 illustrates example order detail interfaces in accordance with some example implementations of the present application.

Figure 22:
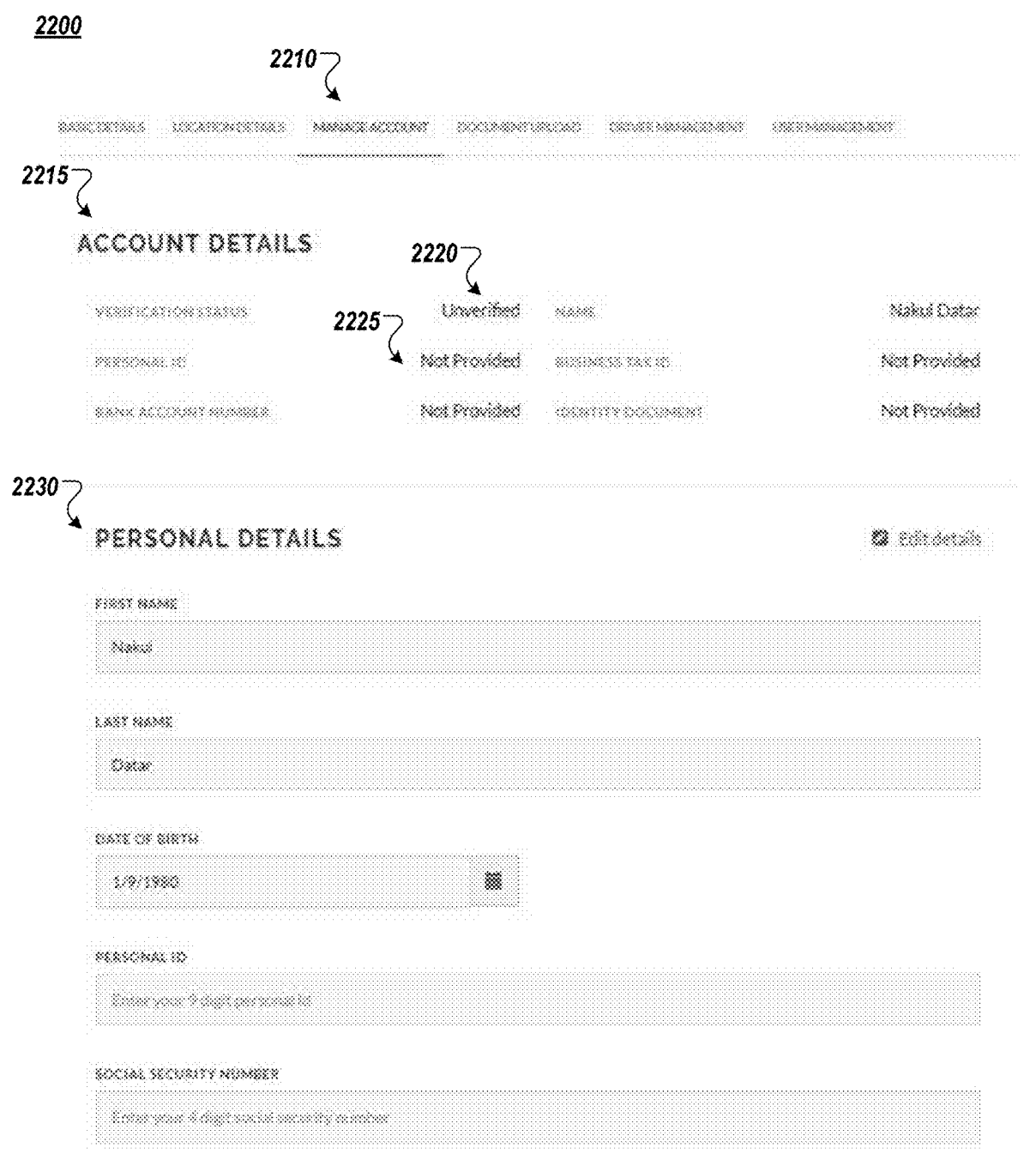

FIG. 22 illustrates an example transporter registration interface in accordance with some example implementations of the present application.

FIG. 24 illustrates example document verification interfaces in accordance with some example implementations of the present application.

FIG. 27 illustrates example user management interfaces in accordance with some example implementations of the present application.

Figure 28:
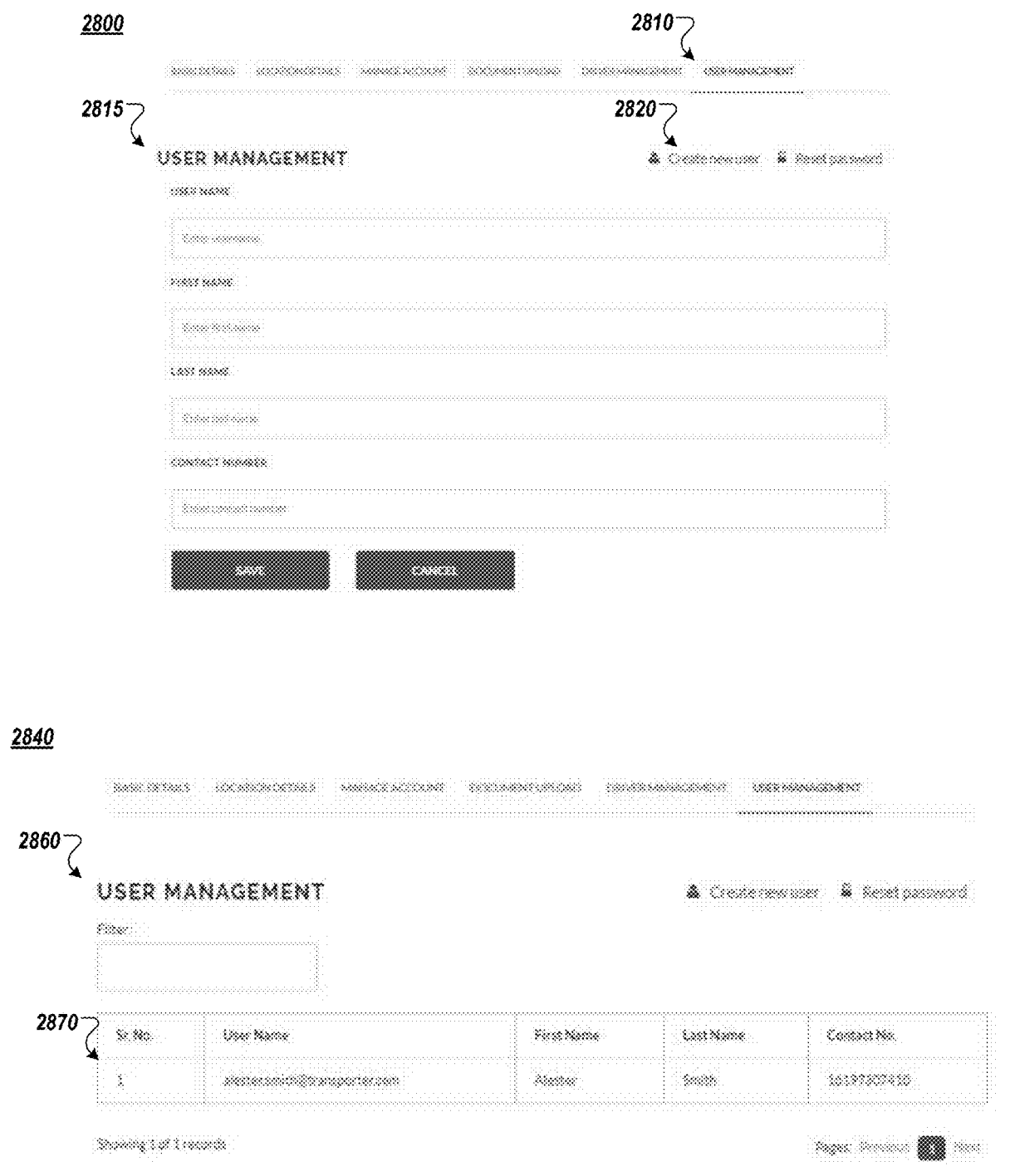

FIG. 28 illustrates example user management interfaces in accordance with some example implementations of the present application.

FIG. 31 illustrates example transporter mobile interfaces in accordance with some example implementations of the present application.

FIG. 32 illustrates an example invoice interface in accordance with some example implementations of the present application.

DETAILED DESCRIPTION

Figure 1:
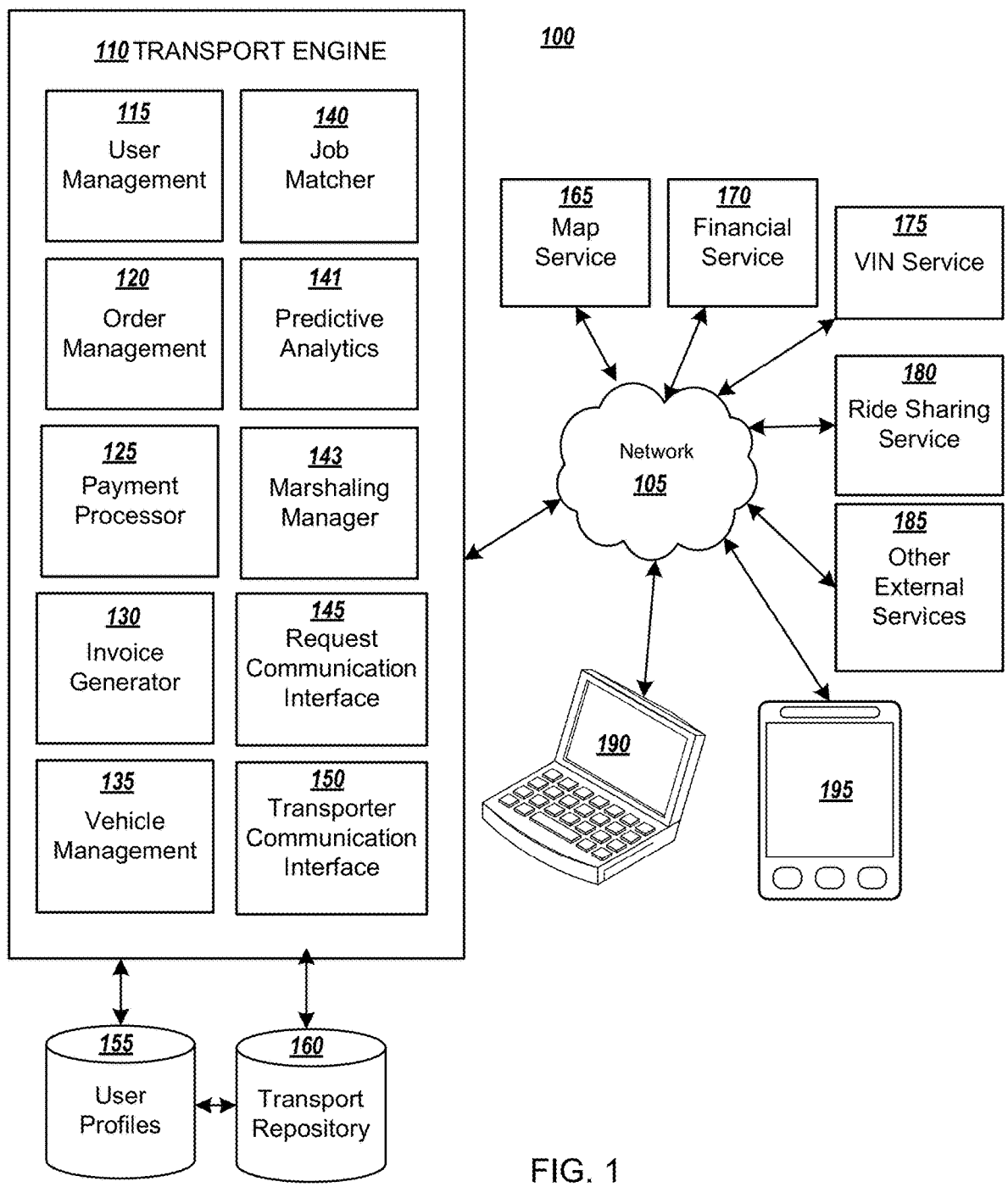
FIG. 1 illustrates a transporter application environment usable with example implementations of the present application.

Example implementations of the present disclosure provide an on-demand platform for matching transporters with shipping requests, documenting the delivery in real-time, and processing paperwork and payments to the various parties involved. As described herein, the subject of the disclosure is a comprehensive software tool to streamline booking, transportation, invoicing, and payment processing for shipment of goods.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Aspects of the present disclosure include a marketplace for receiving an order request to deliver one or more vehicles to a delivery location. The method can include determining a transport fee to associate with the order, generating a transport request that includes map information for the requested pickup and delivery locations, and providing to one or more transporters the generated job request for display with a map based on the transporters location information. The method includes matching criteria and interfaces to assign a transporter to deliver one or more vehicles. The method can include functionality to interface with a mobile device of the transporter or a driver to determine availability, location, dynamic transport capacity, schedule availability, driver qualifications, travel information, estimated arrival time, real-time in-route tracking, document the vehicle condition, route the driver to the delivery location, generate a bills of lading, process payment transfers, and enable messaging between parties of the transaction, to name a few. The method can include intelligence for suggesting a next job to a driver that satisfies the driver's location, driver's target destination, driver's schedule, driver's updated capacity, etc. The method can coordinate multiple transporters or drivers to service a request.

According to an aspect of the present disclosure, a predictive analysis method is disclosed that optimizes transport services using information including, for example, transporter capacity, location preferences, and behavior modeling to promote suitable transport orders. For example, the predictive analysis can determine added transport costs associated with a route as well as potential scheduling and demand constraints. Further, predictive analysis is used to price and schedule sub-routes that break an order into segments.

Different from conventional people moving or package moving solutions, the predictive analysis described herein address vehicle transport scheduling and demand that uses drivers to transport (e.g., via tow-truck, car hauler, etc.) or ferry (e.g., drive a vehicle that is part of the order) for delivery. The predictive analysis is based on constraints, for example, vehicle size, vehicle weight, transport time, route options, marshaling, etc. that is customized based on, for example, driver availability, driver capabilities, route preferences, etc. that maximizes driver profitability. Further details are described below in reference to FIGS. 1-6.

Aspects of the present disclosure provide a device agnostic platform to manage and market transport services that integrates with manufacturer, car dealer, and vehicle auctioning data flows including vehicles VIN number management and GPS tracking, payment and invoice processing, report generation with customizable interfaces to streamline transport service workflows with-in and across organizations. For example, dealers or auction houses can submit a vehicle delivery request, instantly receive a price estimate and locate drivers to deliver the vehicle on schedule. The platform creates new optimization opportunities for matching orders and drivers while reducing or eliminating any paperwork, phone calls and emails that traditionally leave much of the process to chance or an ad hoc basis.

Additional aspects of the present disclosure include methods for user profile registration, validation, verification, and rating. The method can analyze schedule and resource constraints to recommend a series of transports to a driver, assist the driver with collecting and documenting pickup and delivery, and help maximize efficiency. The method also customizes user interactions based on various user types, order types, and special instructions.

Additional aspects of the present disclosure include methods for driver management tools to track, report, and assist with compliance to local, state, and/or federal regulations, such as mandatory driver breaks, valid driver's license maintenance and renewal, driver license class restrictions, environmental paperwork, etc.

Additional aspects of the present disclosure include a non-transitory computer readable medium having stored therein a program for making a computer execute a method of real-time transporter management. Additional aspects of the present disclosure also include an apparatus configured to perform real-time transporter management. The apparatus can include a memory, and a processor configured.

FIG. 1 illustrates a transporter application environment 100 usable with example implementations of the present application. The transport application environment 100 includes a transport engine 110, a network 105, a one or more storage repositories (e.g., user profiles 155, transport repository 160), and can interface with one or more external services (e.g., map service 165, financial service 170, VIN service 175, ride sharing service 180, or any other external service 185). Transport engine 110 can execute under any operating system (OS) (not shown), in a native (e.g., computer 190), mobile device 195, or virtual environment.

Transport engine 110 provides functionality to manage vehicle transport between registered parties via customized interfaces. Transport engine 110 can include a user management module 115, an order management module 120, a payment processor module 125, an invoice generator module 130, a vehicle management module, a job matcher module 140, a predictive analytics 141, a marshaling manager 143, a request communication interface 145, and/or a transporter communication interface. One or more communication interfaces, e.g., request communication interface 145, transporter communication interface 150, can include an application programming interfaces (API) to third part service, e.g., map service 165, financial service 170, VIN service 175, ride sharing service 180, or any other external service 185.

In some example implementations, when information or an execution instruction is received by API 165-185, it may be communicated to one or more other units (e.g., user management 115, order management 120, payment processor 125, invoice generator 130, vehicle management 135, job matcher module 140, predictive analytics 141, marshaling manager 143, request communication interface 145, transporter communication interface 150). For example, map service 165 can interface with user management module 115 to process address information associated with a registered profile to validate stored addresses (e.g., user profiles 155). In an example, transporter communication interface 150 can communicate with map service 165 to process GPS information from a driver's mobile device (e.g., 195) and provide tracking information to one or more registered users (e.g., 190) associated with a transport job. The described units and elements can be varied in design, function, configuration, or implementation and are not limited to the descriptions provided.

Transport engine 110 facilitates vehicle transport order communication between various parties including dealers, transporters, drivers, auction houses, manufacturers, warehouses, etc. The transporter engine 110 includes user management 115, request communication interface 145, transported communication interface 150 services to allow the parties to a transport order to communicate (e.g., data entry, image entry, data base sharing, direct messaging, etc.) that allow messages to communication between For example, transport engine 110 provides tools to automatically transfers information between a driver and the pick-up party as well as direct and group messaging to confirm an estimate arrive time after order is claimed by a driver. The transporter application can push messages to the various users based on registered contact information without needing to share the registered contact information with other parties to the communication. For example, a dealer waiting for pickup can direct message the driver via the transporter application.

User management services 115 maintain inventory and on-demand availability of users, as well as, historical and future activities used for predictive analytics 141. As described herein, each user may have an associated schedule, calendar, or vacation setting to allow users to specify their availability during certain times, availability to pick-up from or deliver to certain zip codes, truck maintenance, or indicate an expected truck capacity. For example, a driver can specify that they have a tow truck and are available to work during weekday afternoons around San Diego. According to an example implementation, voice data and images (e.g., vehicles, insurance cards, driver's license, VIN numbers, etc.) can be processed to extract information (e.g., natural language recognition, ocular character recognition, etc.) that is automatically used by the transport engine 110.

Order management 120, payment processor 125, invoice generator 135, vehicle management 135 services include tools to track, report, and assist with compliance to local, state, and/or federal commercial driver regulations, such as mandatory driver breaks, valid driver's license maintenance and renewal, driver license class restrictions, environmental paperwork, etc. For example, based on the driver's associated schedule, the transporter application can block job requests from drivers that will have the driver continuously driving in excess of regulator limits.

In an example, the user management services 115 can track the driver's activity via the GPS of the driver's mobile device, determine local regulations associated with the GPS, schedule a break in view of the local regulations, block the driver from seeing or accepting job requests during the scheduled break, request that the driver acknowledge the break was completed, and report the acknowledgement with GPS activity during the break time period.

Regarding driver's license maintenance and renewal the user management services 115 can gather additional information associated with their driver's license during a registration process and provide alerts, ticket monitoring, reminders, etc. based on the additional information. The transporter engine 110 accesses third party services 185 (e.g., department of motor vehicles, insurance reporting agency, etc.) to verify the driver license information is valid or indicates the license was revoked. Regarding driver class restrictions, the user management services 115 can check that the capacity of an assigned truck does not exceed the class restrictions of the driver's license.

Job matcher 140 service interacts with the user management 115, order management module 120, vehicle management module, predictive analytics 141, and marshaling manager 143, to rank, price, and optimize orders for each individual order and driver. Job matcher 140 can adjust ranks, prices, and availability of orders or drivers in real-time to optimize order fulfillment and driver profitability within a region and/or sub-region.

Job matcher 140, predictive analytics 141, and marshaling manager 143 services provided optimized order management and routing information. Job matcher 140 service, for example, can push or publish orders to a map based interface to qualify an available driver, among other features. Predictive analytics 141 service can, for example, optimize and rank orders based on historical user activates (e.g., common routes, address book, pricing, etc.) as well as real-time scheduling information (e.g., driver schedules, requested times, vehicle availability, traffic conditions etc.). According to an example implementation, orders are optimized for matching with drivers using predictive analytics based on a logical box algorithm that prioritizes matches across several orders. For example, the logical box algorithm can identify a region or sub-region associate with drivers' or requesters' historical or preferred addresses and optimize a series of orders across a set of drivers. Accordingly, the predictive analytics 141 service calculates demand within a region and/or sub-region to optimize job matching with available (e.g., live status, self-scheduled availability, predictive driver activity, etc.) drivers based on geographic inputs (e.g., origin, destination, preferred routes, hotspots, etc.).

Marshaling manager 143 service can optimize inter-region orders using a series of drivers. Marshaling manager 143 can segment an order into multiple pick-up and drop-offs between drivers at qualifying locations. For example, a cross country transport can be completed by a single long haul driver or a multiple short haul drivers that marshal the vehicle between regions to reach the destination.

The marshaling manager 143 service works in real-time with the job matcher 140 and predictive analytics 141 services to calculate permutations of options that published or pushed to drivers in different regions. According to an example implementation, the marshaling manager 143 service calculate various options available to segment an order. Each segment of each option can be separately priced, optimized, published, and updated in real-time. For example, the availability and pricing of a segment is updated, adjusted, and targeted to drivers as other segments of marshaling option are selected by other drivers.

According to an example implementation, drivers select marshaling orders, the marshaling manager 143 service manages requests for the other segments, and confirms or removes segments after a complete marshal option (e.g., a series of segments from an origin to a destination) is selected. In an example, one segment can belong to multiple marshal options and the marshaling manager 143 service can remove or add segment options based on driver selection. Accordingly, the marshaling manager 143 service provides real-time dynamic job matching across multiple regions.

In an example implementation, the marshaling options and a single route option for an order are published and adjusted via the predictive analytics 141 service as drivers select segments of the marshaling options. The marshaling options and the single route option compete based on driver response until a confirmed complete route booked.

Figure 2:
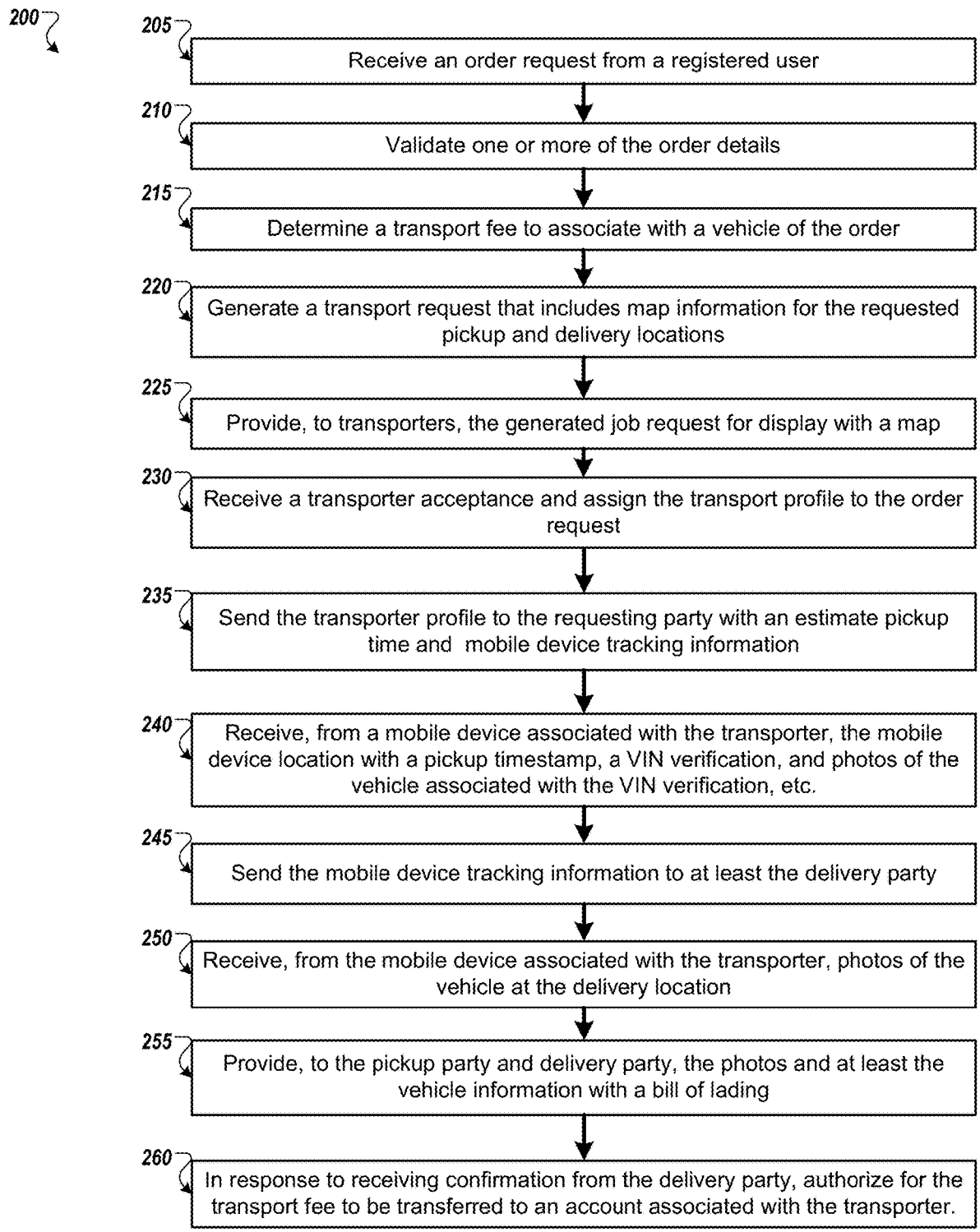
FIG. 2 illustrates an example flow diagram of a process for transporter management according to example implementations of the present application.

FIG. 2 illustrates an example flow diagram of a process for transporter management according to example implementations of the present application. The illustrated process 200 may be performed by a processing device (such as processor 415 of FIG. 4) of a device (such as devices 310-355 of FIG. 3) to provide transporter management. In process 200, a requesting party, one or more transporters, and a delivery party interact to process a vehicle transport order.

At block 205, the processing device receives an order request from a registered user. The order can include order details, such as a sender profile ID, a pickup location, a delivery location, a VIN, schedule information (e.g., requested pickup period, requested delivery period, delivery options, etc.). In some implementations, the order can include multiple vehicles and associate VINs for each vehicle with the order details. The order request can also include additional information, such as a drop off details, pickup details, messages, etc. In some implementations, the order request can include additional services, such as car cleaning, repair, covered transport, etc. Additional services may be services to be provided in addition to transport services provided by the transport user. For example, an auction house user can request the dealer give the car a detailed cleaning and oil change prior to the transport pick schedule.

At block 210, the processing device validates one or more of the order details including retrieving vehicle information based on the VIN. The vehicle information can include a make, model, year, condition, color, etc. The retrieved vehicle information is used throughout the transport process for verification and documentation of the transport service.

At block 215, the processing device determines a transport fee to associate with a vehicle of the order. The processing device can use one or more algorithms to determine the transport fee. For example, an algorithm can factor in the distance from the pickup location to the delivery location, time of day of schedule information, a driver rating, volume charge or discount, etc. One or more third-party database or external services can be accessed to gather input factors for the algorithm in view of the order details. For example, the algorithm can include determining tolls associated with the delivery route. Some routes may include tolls based on the number axels, a total transporter weight, transporter type etc. In some example implementations, the transport fee is adjusted based on predicting actual toll costs in view of a transport inventory of the transporter vehicle. Further, the transport fee can be used for route optimization.

At block 220, the processing device generates a transport request that includes map information for the requested pickup and delivery locations. In some implementations, the processing device can set flags to filter the transport request in view of information associated with a transport user. For example, the transport request can include a pickup radius based on the schedule information (e.g., pickup period) and flag to filter the transport request from transport users with a GPS location outside the radius.

At block 225, the processing device provides to one or more transporter profiles the generated job request for display with a map. The processing device can provide the map location labels to transport users on a map display along with additional details such as the pickup period, delivery period information, vehicle information, transport fee, trip distance, estimated travel time, etc. The display can include a pickup distance based on a GPS location associated with a mobile device of the at least on driver. In some implementations, each transporter profile of the one or more transporters comprises at least one registered driver profile and at least one registered vehicle mover. For example, the registered vehicle mover can be associated with a load capacity, availability, or qualification.

In some implementations, each user may have an associated schedule, calendar, or vacation setting to allow users to specify their availability during certain times, availability to pick-up from or deliver to certain zip codes, truck maintenance, or indicate an expected truck capacity. For example, a driver can specify that they have a tow truck and are available to work during weekday afternoons around San Diego. The transport application access by a driver/transporter can filter out (e.g., suppress, not transmit, etc.) transport requests based on the driver's capacity and availability. In the example, the driver is presented with transport requests that have a requested pick-up and delivery window during weekday afternoons around San Diego. In an example, the weight of each vehicle associated with orders, and the transport truck is tracked for predictive toll, fuel economy, and time costs, At block 230, the processing device receives a job transporter acceptance from one of the transport users and assigns the transport profile to the order request. In some implementations, the job transporter acceptance indicates an estimated pickup time within the schedule information, the driver profile associated with the vehicle mover profile, an updated available capacity of the vehicle mover, schedule availability, etc.

At block 235, the processing device sends, to the pickup party, the job transporter/driver profile, the estimate pickup time, and a mobile device tracking information.

At block 240, the processing device receives, from a mobile device associated with the transport profile, the mobile device location with a pickup timestamp, a VIN verification and one or more photos of a vehicle associated with the VIN verification, etc. The VIN verification can be a photo or scan of a physical VIN tag coupled to the associated vehicle.

At block 245, the processing device sends, to the receiving party, an estimated delivery time and the mobile device tracking information. In response to the mobile device location information matching the delivery location, the processing device can receive (or request), from the mobile device, a delivery timestamp another set of one or more photos of the vehicle associated with the verified VIN.

At block 250, the processing device receives, from the mobile device associated with the transport profile, one or more photos or other media of the vehicle at the delivery location. The media can be photos or video with a timestamp and GPS record of the associated vehicle.

At block 255, the processing device provides, to the pickup party and delivery party, the one or more photos and the another set of one or more photos and a bill of lading. The bill of lading can include information from the VIN, the transporter, the pickup party, and the delivery party profiles, the mobile device GPS data with timestamps, etc.

At block 260, in response to receiving confirmation from the delivery party, the processing device sends authorization for the transport fee to be transferred from an account associated with a payer profile to an account associated with the transporter. Additionally, the processing device can authorize payment to be delivered to the pickup party.

Figure 3A:
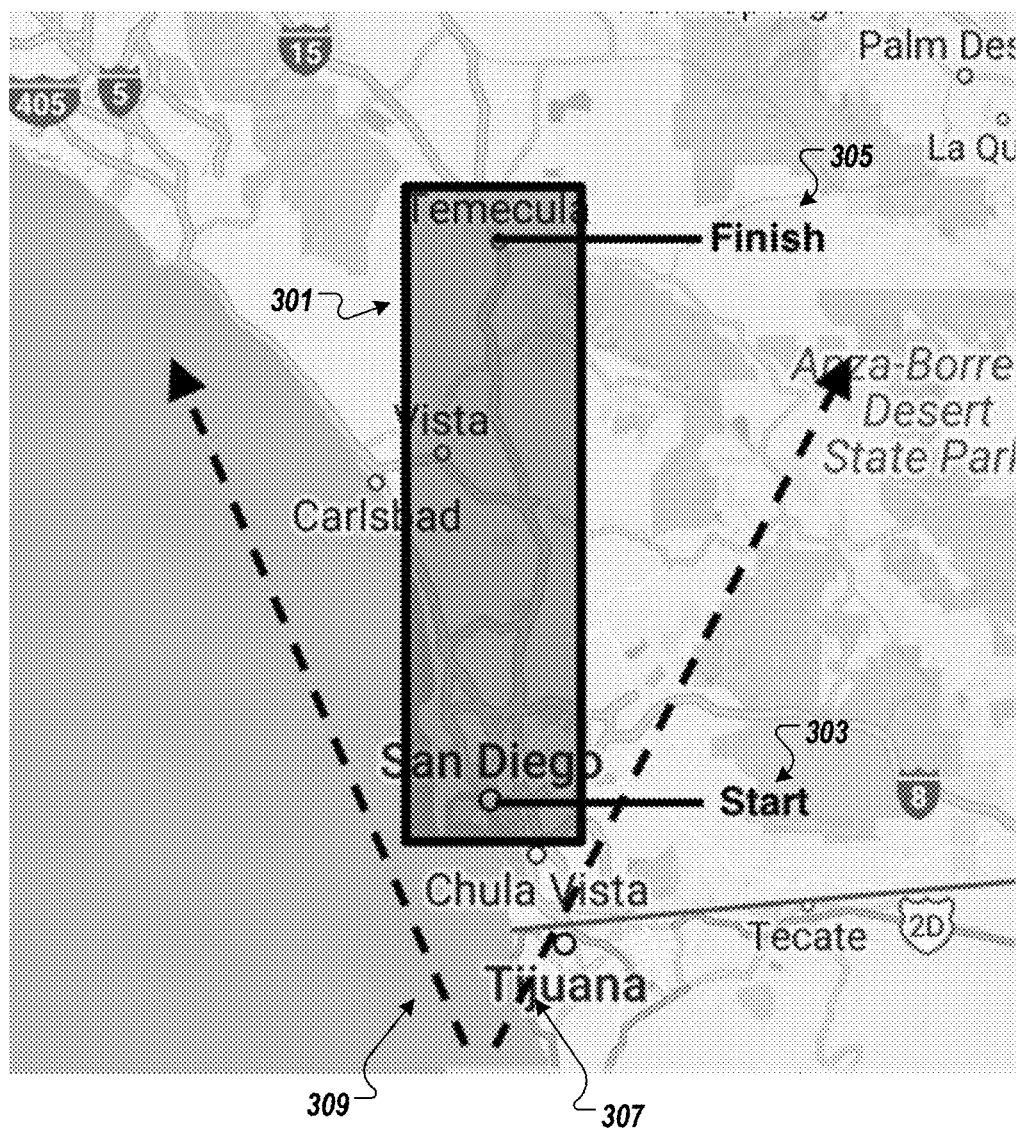
FIGS. 3A-B shows an example process for predictive analysis of transporter services in accordance with example implementations of the present application.
Figure 3B:
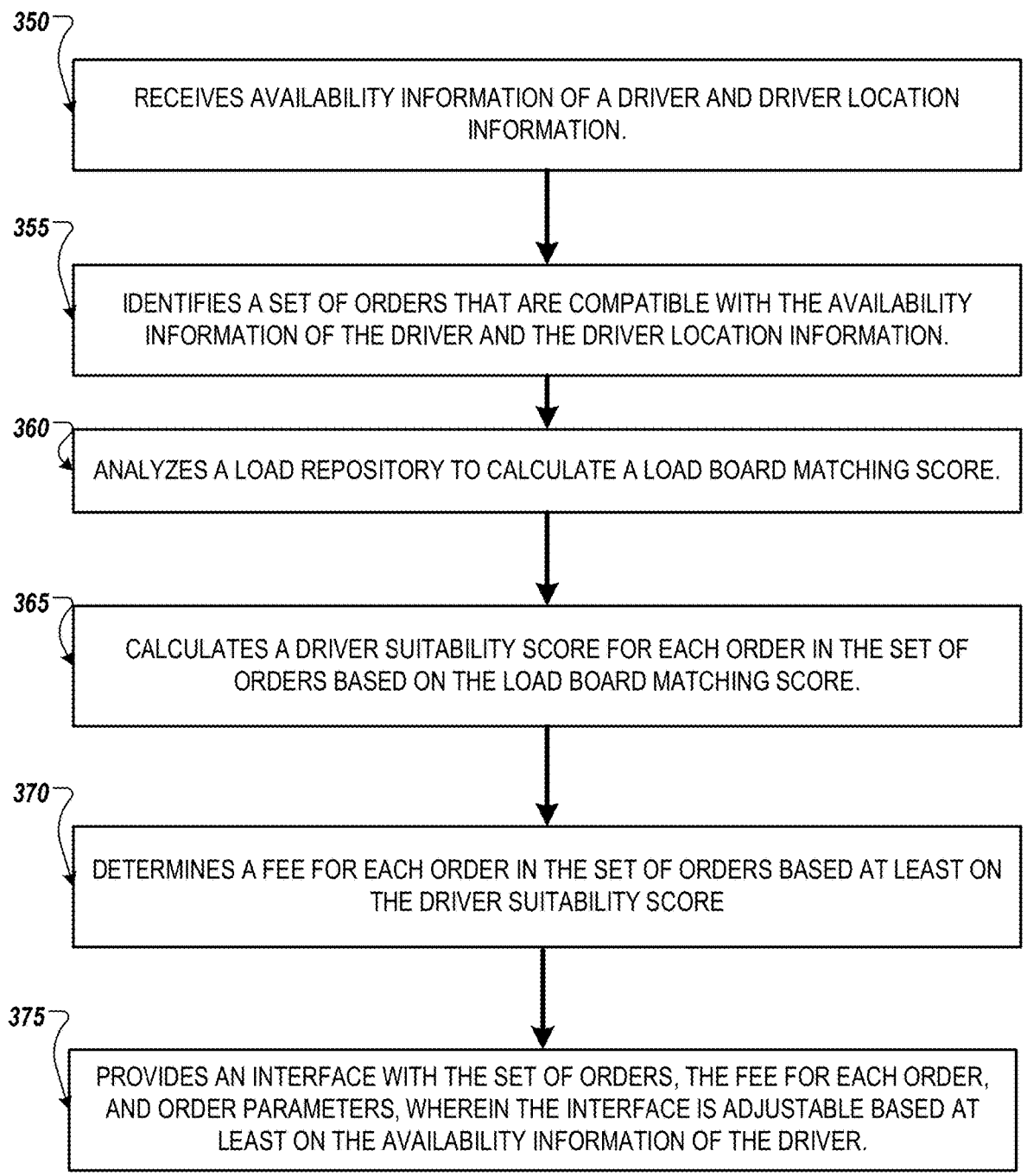

FIGS. 3A-B shows an example process for predictive analysis of transporter services in accordance with example implementations of the present application. FIG. 3A illustrates process for predictive analysis that uses location information of a driver to optimize route selection, costs, and fee arrangements. For example, a driver can indicate location information by selecting a start location 303 and finish location 305 (e.g., latitude and longitude) that can be used to determine a ranked list of similar orders. A bearing is calculated between the start and the finish, similar orders are then expected to be within some threshold (e.g. 0 degrees+/−30 degrees) of the bearing from start to finish. A sub-region 301 can be calculated (and optionally presented as a visual to the interface) that logically defines a sub-region around the start location 303 and finish location 305 at the angles 309 and angle 307 of the bearing. For example, if the bearing of start to finish is 45 degrees, the edges of the box are at angles of 45 and 135 degrees), with an added threshold (e.g., a percentage of the total distance of between the start location 303 and finish location 305).

Orders can be filter that include a start location 303 and finish location 305 or segment with a start location 303 and finish location 305 within the logical sub-region 301. Orders are sorted, ranked, and scored based on driver preferences or priority, For example, orders with distance within the box can ranked based on routes with lowest transportation cost or best traffic scores. Return trip orders can be determined by inverting the bearing (i.e. bearing module). Other characteristics can be examined to further narrow the orders returned, including but not limited to capacity of trailer, size of cars, operability of cars, electronic logging device statues, etc.

FIG. 3B illustrates flow diagram for a process of predictive analysis according to example implementations, the process 340 illustrates a transporter management according to example implementations of the present application. The illustrated process 340 may be performed by a processing device (such as processor transporter engine 110 of FIG. 1) to interact with a device (such as devices 3510-3555 of FIG. 35) to provide transport services. In process 340, a requesting party, one or more transporters, and a delivery party interact to process a vehicle transport order.

According to an example implementation, a processing device uses predictive analysis to determine a set of orders to provide to a driver. At block 350, the processing device receives availability information of a driver and driver location information. The availability of the driver can include schedule information, load capacity, predicted load capacity, load weight limit, transporter truck limits, dimensions, etc. For example, predicted load capacity can calculate a load capacity or weigh based on predicted schedule information. If the driver is predicted to pick up a return load after a currently scheduled trip based on past behavior, the predictive load can be based past loads of similar circumstance or location, currently scheduled orders, and/or predicted orders.

In an implementation, the processing device can analyze projected traffic data associated with the set of orders. Location information can include at least one of a device location, a current location, a destination location, a scheduled location, and past location history. Location can refer to a geographic region, sub-region, address, address or coordinates. At block 355, the processing device identifies a set of orders that are compatible with the availability information of the driver and the driver location information.

At block 360, the processing device analyzes a load repository to calculate a load board matching score. In an implementation, the load board matching score is based on a user supply in view of a transport demand for a time associated with the availability information of the driver and one or more transport locations associated with the driver location information.

The user supply is based on analyzing user information of other drivers for the one or more transport locations, wherein user information comprises schedules, projected schedules, capacities, predicted capacities, route preferences, past behaviors, etc. The transport demand can be based on analyzing transport schedules for the one or more transport locations, wherein transport schedules comprise placed order, parameters of placed order, projected orders, predicted parameters of projected orders etc. during times associated with the availability information of a driver.

At block 365, the processing device calculates a driver suitability score for each order in the set of orders based on the load board matching score. In an implementation, the processing device can calculate the driver suitability score for each order by identifying a set of users with user information that satisfies at a set of order parameters for an order in view of the load board matching score. For example, the user information can include schedules, projected schedules, capacities, predicted capacities, route preferences, or past behaviors of other drivers, etc.

At block 370, the processing device determines a fee for each order in the set of orders based at least on the driver suitability score. At block 375, the processing device provides an interface with the set of orders, the fee for each order, and order parameters, wherein the interface is adjustable based at least on the availability information of the driver.

The interface updates in real-time based on changes in the platform. The processing device can receive further updated location information; and then update the set of orders provided to the device based on the updated location information. The processing device can receive further updated order information and update the set of orders provided to the device.

In an example implementation, the processing device receives a selected order from the set of orders and further process the order as described herein. For example, the mobile device of the driver can receive the order parameters with driving directions to a start location for the selected order. A server can send tracking information for a device location of the driver to any party to the transaction or record for record keeping purposes. For example, a server can records timestamps in response to the device location matching the start location and at different stages as the driver continues to complete the order steps. The driver can send one or more images of a vehicle or paperwork that are stored and provided to the parties as reports.

According to an example implementation for finding a job based on a driver preference, a method includes receiving a request to suggest a new order based on a current order; identifying one or more potential orders with a pickup location within a threshold vicinity of the current order delivery location, wherein the potential orders have a delivery location within a threshold vicinity of the driver home location that is associated with the driver profile or targeted destination; determining a future truck capacity associated with the driver after the first delivery is completed and an estimated delivery time associated with the current order; selecting one or more of the potential orders with a load size that is less than or equal to the future truck capacity and have a pickup time period within a threshold layover period based on the estimated delivery time associated with the current order; providing the selected orders to the driver as a return home order.

According to another example implementation a driver can find a job without a truck/transporter vehicle that drives the vehicle that is associated with the order (e.g., car ferrying). The transport service can locate, order, and integrate with local people mover services to get the driver to the pick-up/start locations and/or from the drop-off/finish locations. For example, the transport service can include integration with people mover services such as a taxi, limousine, shuttle, rental transportation, or ride-sharing services, etc. That is, the transport service can integrate with the people mover services to the get the driver from their current location to the pick-up (or start location). After the job is completed, the transport service can locate people mover services to return the driver from the destination or finish location to another pick-up location or, for example, their home. For example, a driver located in their home can select a job to drive a vehicle from a dealership pick-up location near their home to an auction destination site across a town or across a region, the transport service can locate local transportation to transport the driver from their home to the dealership, the driver can then drive the vehicle from the dealership to the auction destination.

An example implementation includes a method of receiving availability information of a driver and driver location information; identifying a set of orders that are compatible with the availability information of the driver and the driver location information, wherein each order comprises a route with a start location and a finish location; provide an interface with the set of orders with a map and order parameters, wherein the set of orders are filterable based at least on the availability information of the driver; calculating a fee for each order, wherein the fee is adjustable based on driver location information; receiving a selected order from the set of orders and a start time; receiving a device location at the start time; requesting a ride-sharing service (e.g., a taxi, limousine, shuttle, rental transportation, or other people moving service, etc.) from the device location to a start location of the selected order; and recording a timestamp in response to the device location matching the start location; receiving one or more images of a vehicle.

The fee can be adjusted based on charges received from ride-sharing service. The method can include sharing tracking information for the device location; recording a timestamp in response to the device location matching the finish location of the selected order; receiving one or more images of a vehicle; and requesting a ride-sharing service from the finish location.

Figure 4:
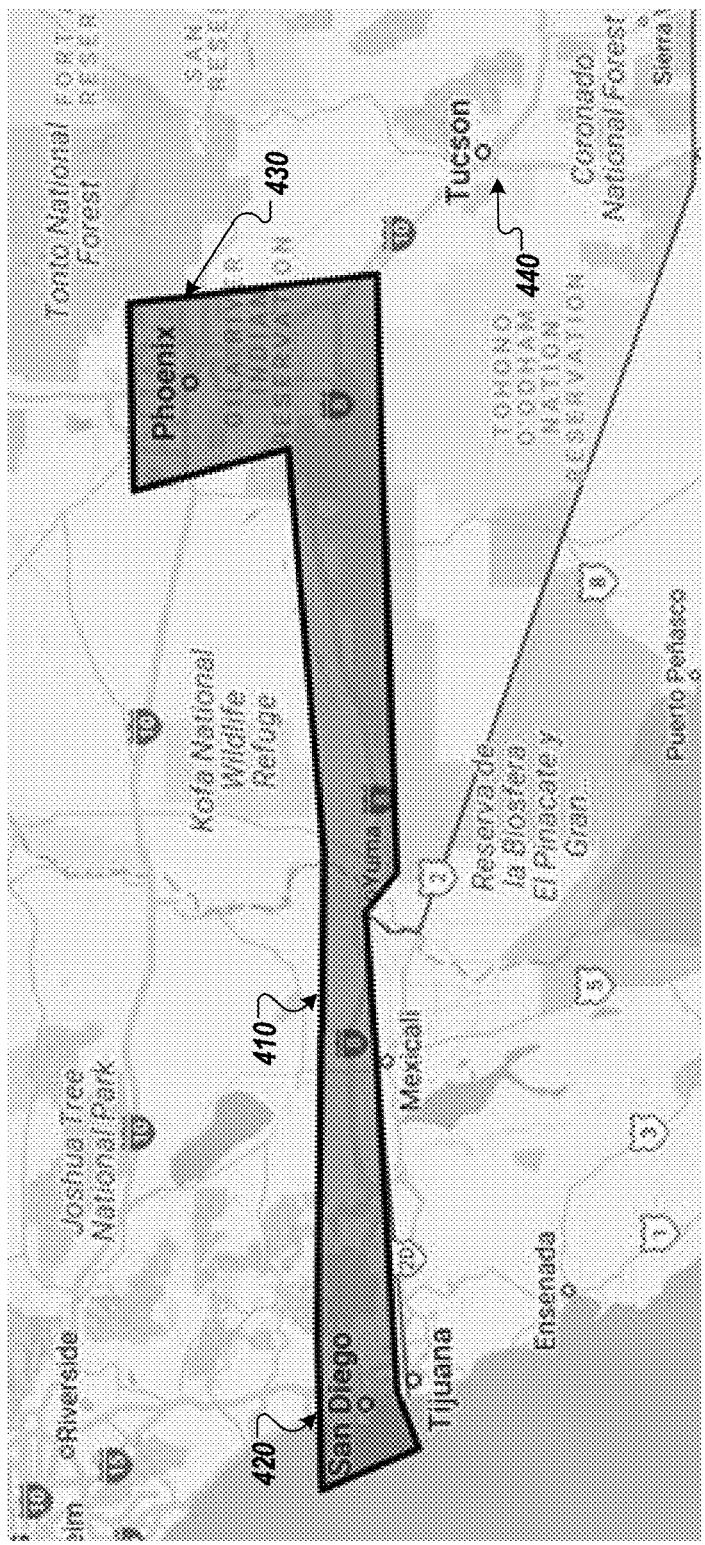
FIG. 4 illustrates an example process for optimizing transporter services in connection with an example implementation described herein.

FIG. 4 illustrates an example process for optimizing transporter services in connection with an example implementation described herein. Drivers can specify the area or locations that they are willing or prefer to drive. The orders can be filter or ranked based on the start location 420 and finish location 430 of an order within the area specified by the driver.

The predictive analysis service can also suggest areas based on a driver suitability score in view load demand matching. For example, the predictive analysis service can run hypothetical scores based on historical load information for a driver's preferences in surrounding areas to identify areas where the driver has a higher suitability score. An underserved need for a specific type of transporter can be discovered and suggested to drivers to improve profitability and efficiency. For example, a transporter may be missing out on numerous compatible orders in a neighboring region 440 that can be added to increase profitability.

Figure 5:
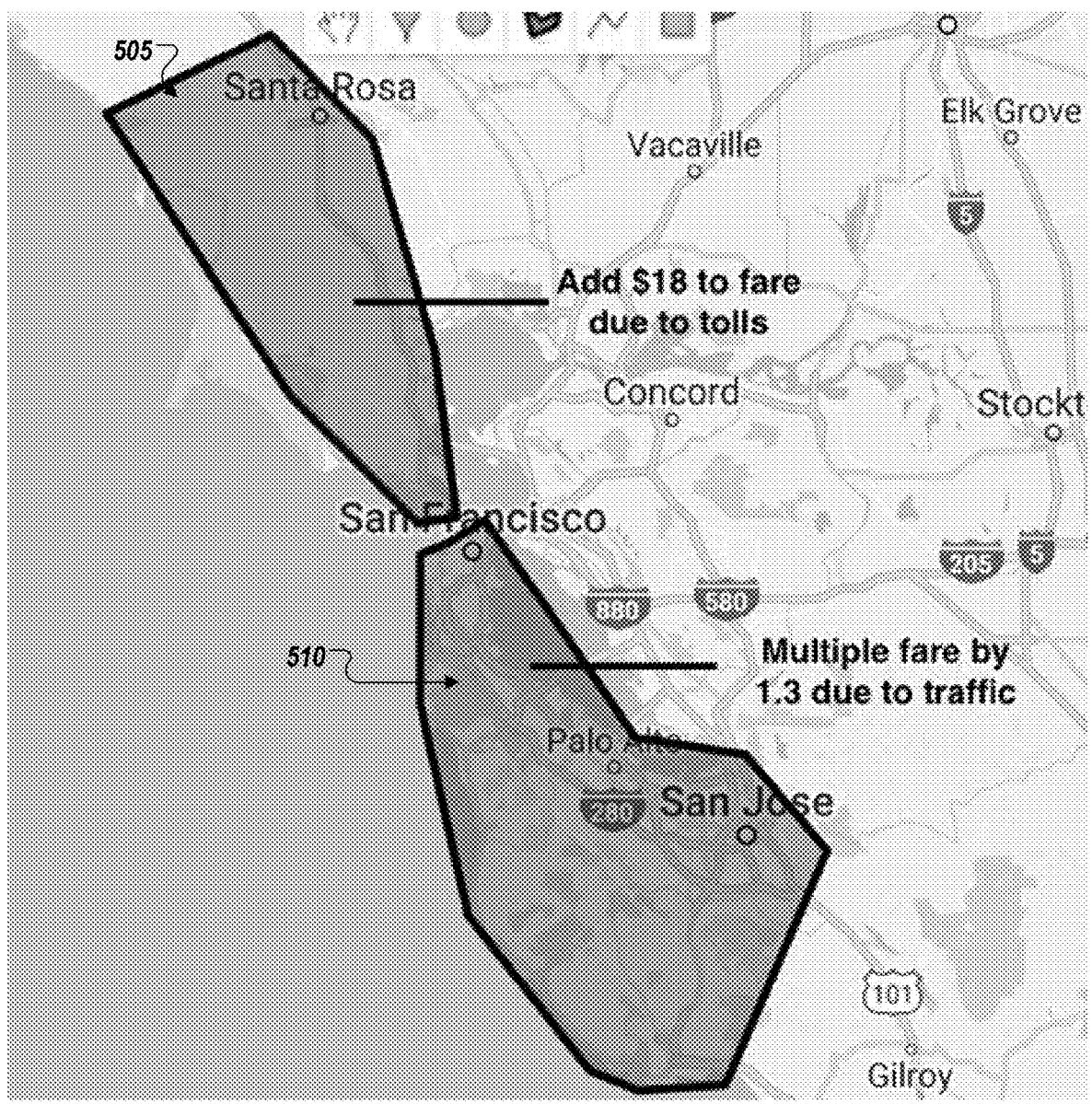
FIG. 5 illustrates an example fee adjustment process for predictive analysis of optimizing transporter services accordance with example implementations of the present application.

FIG. 5 illustrates an example fee adjustment process for predictive analysis of optimizing transporter services accordance with example implementations of the present application. Traffic data and driver preferences can be configured to improve predicted costs and scheduling associated with geographic regions along particular routes. For example, densely populated areas, poor road conditions, inclement weather regions, low visibility zones, high accident zones, etc. can be flagged as hotspots that users can opt to avoid and/or a surcharge cost can be added.

In an example implementation, users can identify or select hot spots using polygons can be applied to map areas to adjust the pricing (up or down) of certain geographical areas. Price adjustment can be multiplicative or additive in nature. Areas can be set flagged in an automated fashion using tracking data and feedback of previously adjusted orders as well as third party resources such as traffic or insurance data.

Areas can be automatically updated in real-time based upon changes in information. For example, a scheduled order can be adjusted based on the traffic predicted at the pick-up time. Some areas use variable rate tolling that increases during certain time periods. The predictive analysis can calculate variable toll rates based on the scheduled route that is updated as the driver approaches a pick-up location and progresses through the transport process. Attractive areas can be automatically made cheaper based upon time to claim/complete order. For example, routes with large service stations or cheap accommodations can weighted as beneficial to the order or a route option.

Figure 6:
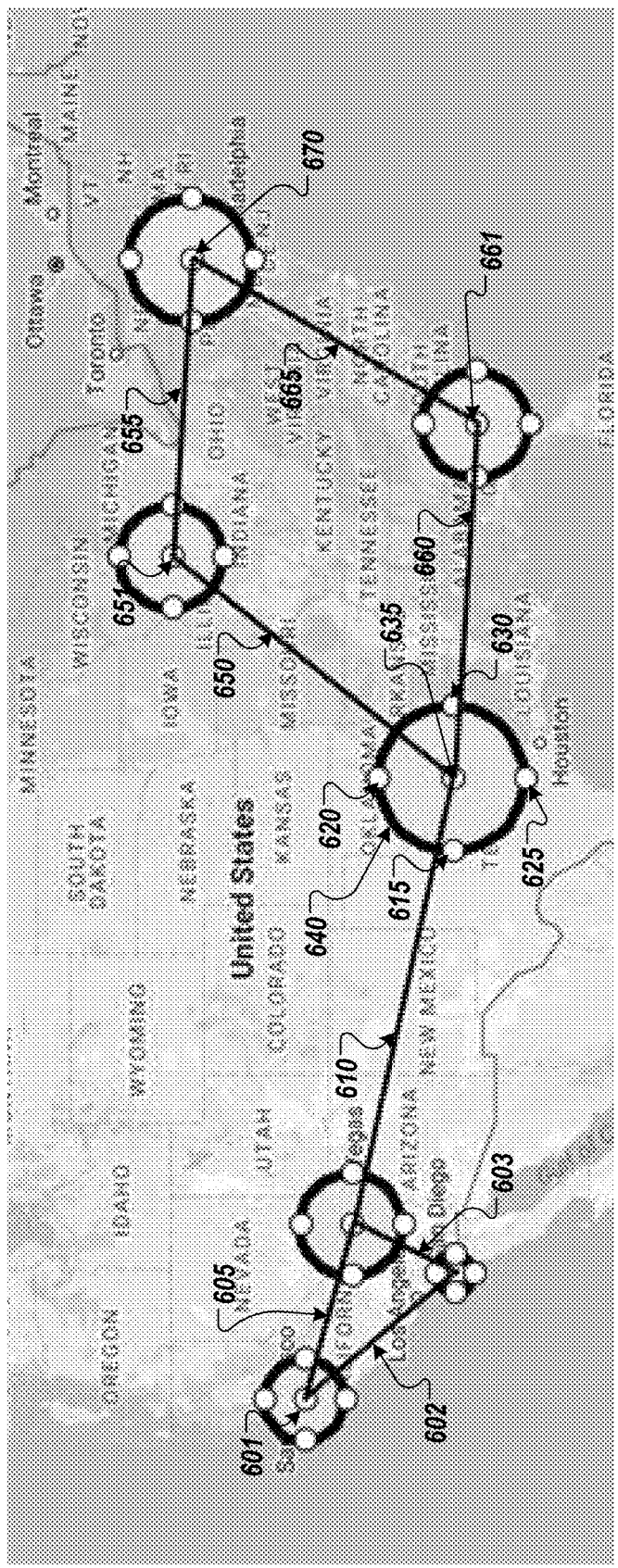
FIG. 6 illustrates an example process for marshaling transporter services in connection with an example implementation described herein.

FIG. 6 illustrates an example process for marshaling transporter services in connection with an example implementation described herein. The system can hold a set of regional marshaling locations 615-635, each of which has a radius 640) to which they pick up/deliver vehicles on smaller trucks and a set of marshaling points (represented by black lines linking circles) to which they transfer groups of vehicles on larger trucks. Orders can be automatically assigned and quickly moved across country by leveraging regional marshaling locations.

A sub-route with segments 650 and 655 can be used between sub-region 635 to sub-region 651 to reach a destination 670. Each segment 650 can have different start points (e.g., regional marshaling locations 615-635) to reach the other sub-region 651 with a variety of finish points. A different sub-route with segments 660 and segment 665 can also be used between sub-region 635 to sub-region 661 to reach a destination 670. Different start locations and finish locations for different segments of different sub-routes can be determined by an optimization function that predicts different factors including price, distance, duration, supply, demand or a combination of multiple factors.

According to an example implementation, a processing device receives an order to transport a vehicle from a pick-up location to a drop-off location with schedule parameters and determines a set of routes between the pick-up location to a drop-off location in view of the schedule parameters. The processing device can determine a set of sub-routes for each route in the set of routes, wherein each sub-route comprise a segment that includes a start location and a finish location along the route, and a master route from the pick-up location to the drop-off location.

Marshaling point can be based on a directory of registered locations or users can register locations are part of the platform. Marshaling can occur inter-region (between two regions) or intra-marshaling (within a region). For example, a local drivers can ferry several cars from different pick-up points in a city to a finish point on the edge of a city as a marshal point for a long haul truck to gather several orders. The location at the edge of the city can serve as both a finish point for an intra-region marshal segment and a start point for an inter-region marshal segment. The processing device calculates a total transport cost for each set of sub-routes comprising a transport cost for each segment of each sub-route and provides an order or portion of the order to users associated with one or more of the start locations and the finish locations. For example, an order from pick-up location 601 to destination 670 can be segmented to provide a portion of the order from a start region 635 to finish point 651 or from start point 651 to finish point 670 for a driver in region 651.

The processing device can receive a group of responses for the users, where each response is associated with a segment of a sub-route, determine from the group of response whether the segments from the group of responses complete at least one route from the pick-up location to the drop-off location.

The transport costs can adjusted based on at least one of a geographical areas score along the route, road fees, schedule parameters, driver preferences, driver fees, etc. For example, the transport costs can be updated based on updated traffic information for the route. In response to determining more than one route, selecting the sub-route based on the determination associated with the lowest transport cost. In response to determining the groups of responses fail to complete at least route, adjusting an order parameter. Once the sub-route is confirmed the process can schedule the users associated with the selected the sub-route.

According to an example implementation, the processing device can calculate an estimated travel time for set of sub-routes, wherein the travel time is adjusted based on the number of segments; determine whether the estimated travel time for each set of sub-routes for each route satisfies the schedule parameters of the order; compare the total transport cost for each set of sub-routes for each route that satisfies the schedule parameters of the order with the total transport cost for each set of sub-routes for each route that do not satisfies the schedule parameters of the order; calculate the greatest difference for the total transport cost based on the determination; and provide the greatest cost difference with the estimated travel time for the sub-routes with the total transport cost associated with the greatest cost difference.

Providing the order to users can include determining whether the user information is compatible with the order parameters and schedule parameters; and calculating a fee based on at least the transport cost in view of the user information.

Figure 7:
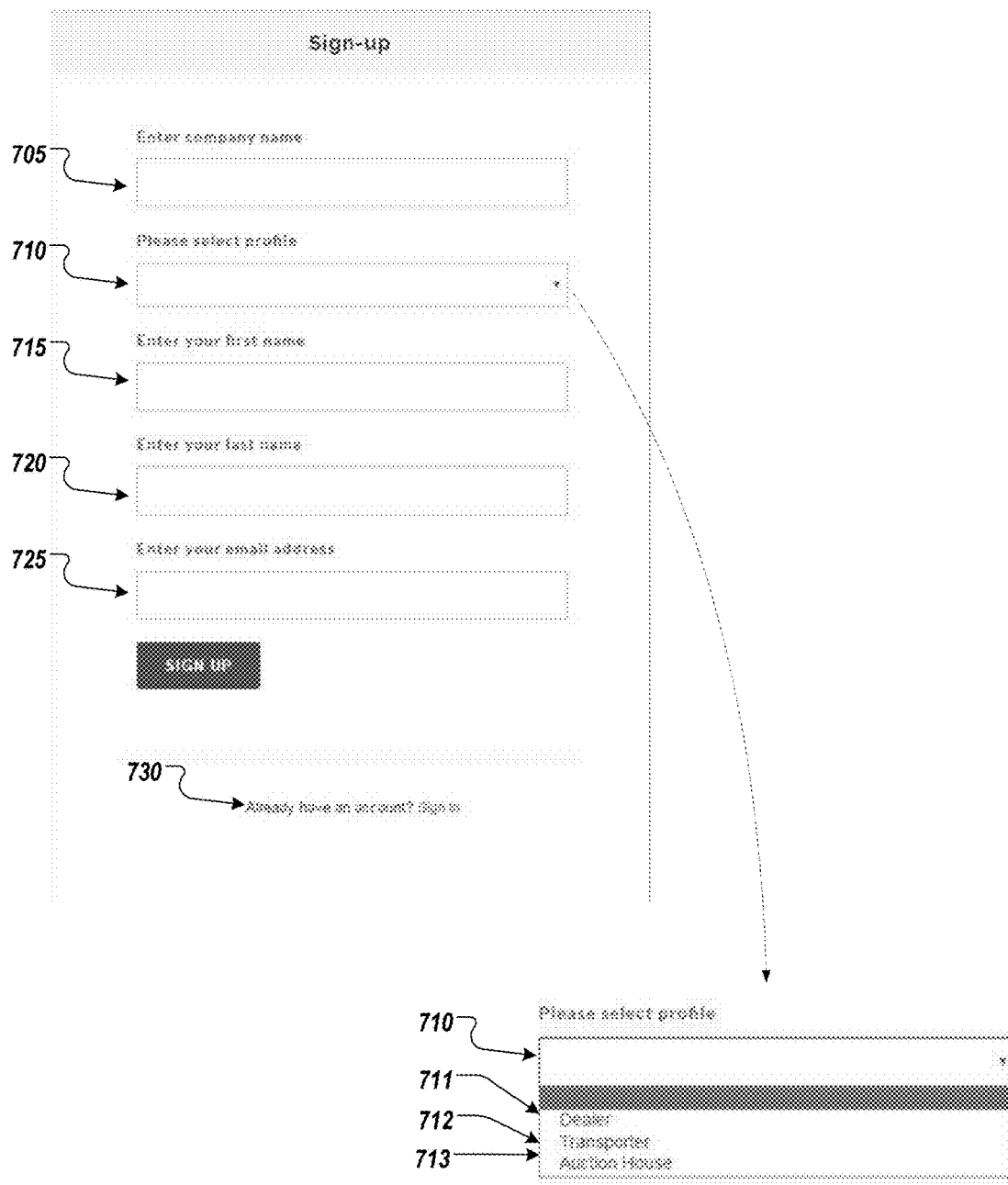
FIG. 7 illustrates an example sign-up interface in accordance with some example implementations of the present application.
Figure 8:
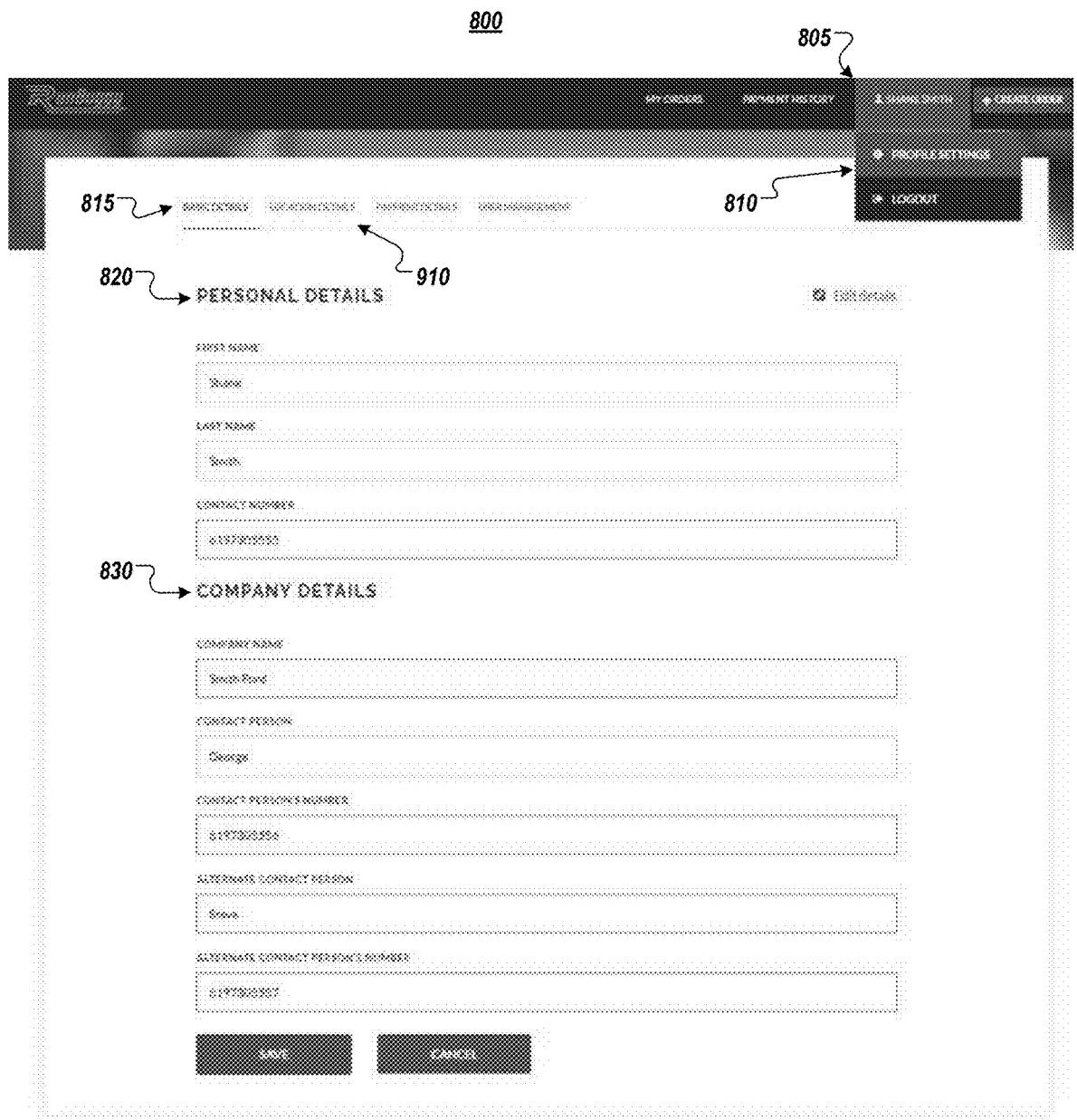
FIG. 8 illustrates an example dealer profile interface in accordance with some example implementations of the present application.

FIG. 7 illustrates an example sign-up interface in accordance with some example implementations of the present application. Items 705-725 allow a new user to start a registration process to become a registered user of the transport application. At 710, the user selects a user type, for example, a dealer 711, a transporter 711, an auction house 712, a car rental agency, etc. Based on the user type 710 associated with a registered user, the transport application can provide a customized user interface to facilitate one or more transport services. For example, a dealer 711 may manage a car dealership and request, receive, or provide services associated with the transport application. The transport application provides a registered dealer 711 with customized forms, interfaces, data access tailored to the dealer services as described above and in view of FIGS. 8-19, and 31.

As shown, the interface includes data entry fields to collect user information. For example, data entry field allow the user to enter a company 705, and first name at 715 enter an email address at 725, or various other data-entry fields. At filed 710, a user can select a user profile type. The field can be of various implementations such as a drop-down, radio button, free text entry, etc. At field 710 the user profile type can be, for example, a dealer 711, a transporter 712, auction house 713, etc. The user profile type 710 is used to determine what additional information may be collected to register a user with a transporter application.

User profiles and registration allow the transporter application to gather static and dynamic information that that allows the application and administrators to verify details with third-party sources. For example, a dealer entrusting a person to transport a vehicle asset worth thousand dollars can utilize the person's registration information to confirm a valid commercial driver's license, a valid insurance policy, prior work history, criminal history, etc. In another example, a person transporting a vehicle can utilize a dealer's profile registration information to determine pickup and delivery locations, verify a payment history of prior transports, verify ownership of the vehicle asset prior to transportation, etc.

In some implementations, the transporter application includes the ability to share roles (transporter/driver) in the same app and perform functions of each other while claiming orders. That is, a driver may also access and manage other drivers, a dealer may also provide transport services, etc. The transporter application can allow users to register as multiple user types, provide registration interfaces for collect registration information associated with additional user types, and enable order interfaces to switch between user types associated with a user profile.

The transport application provides a registered transporter 712 with customized forms, interfaces, data access tailored to the transporter services as described in greater detail in view of FIGS. 1-6 and 20-32.

The transport application provides a registered auction house 713 with customized forms, interfaces, data access tailored to the auction house services as described in greater detail in view of FIGS. 1-6 and 33.

Figure 34:
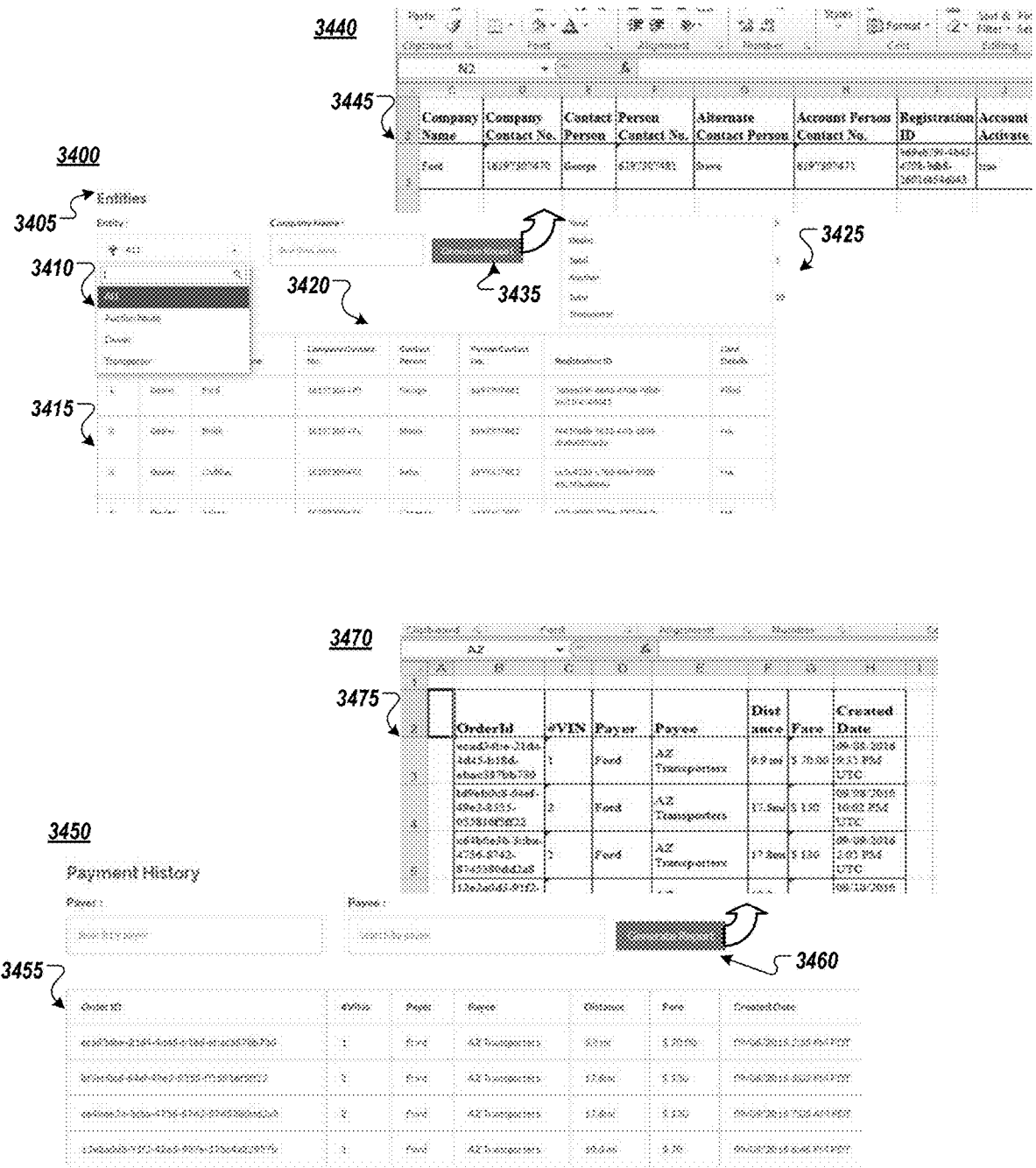
FIG. 34 illustrates example administrator interfaces in accordance with some example implementations of the present application.

The transport application can also include administrator services, for example, document verification, user profile maintenance, dispute resolution, report generation, etc. as described in greater detail in view of FIGS. 24 and 34.

FIGS. 8-17 show example interfaces for a dealer user type in accordance with some example implementations of the present application.

Regarding FIGS. 8-12 illustrate profile registration interfaces for a dealer user profile 711. Dealer interface 800 illustrates a registration screen for gathering basic details from a user. The interface 800 can include name 715 and last name 720 information displayed as a profile name at 805. The interface 800 can include various profile control features such as profile setting 810, logout, etc. The registration process can include one or more registration interfaces to gather categories of data used by the exporter application to process and service orders.

Registration categories can include, for example, a basic details 815 category, location details 910 category, management details category, user management category, etc. Basic details 815 registration category can be used to collect additional personal details a 820, such as first name, last name, contact numbers, etc., company details 830, such as, company name, contact person, contact person's phone number, alternative contact person, alternative contact person's phone number, etc.

Figure 9:
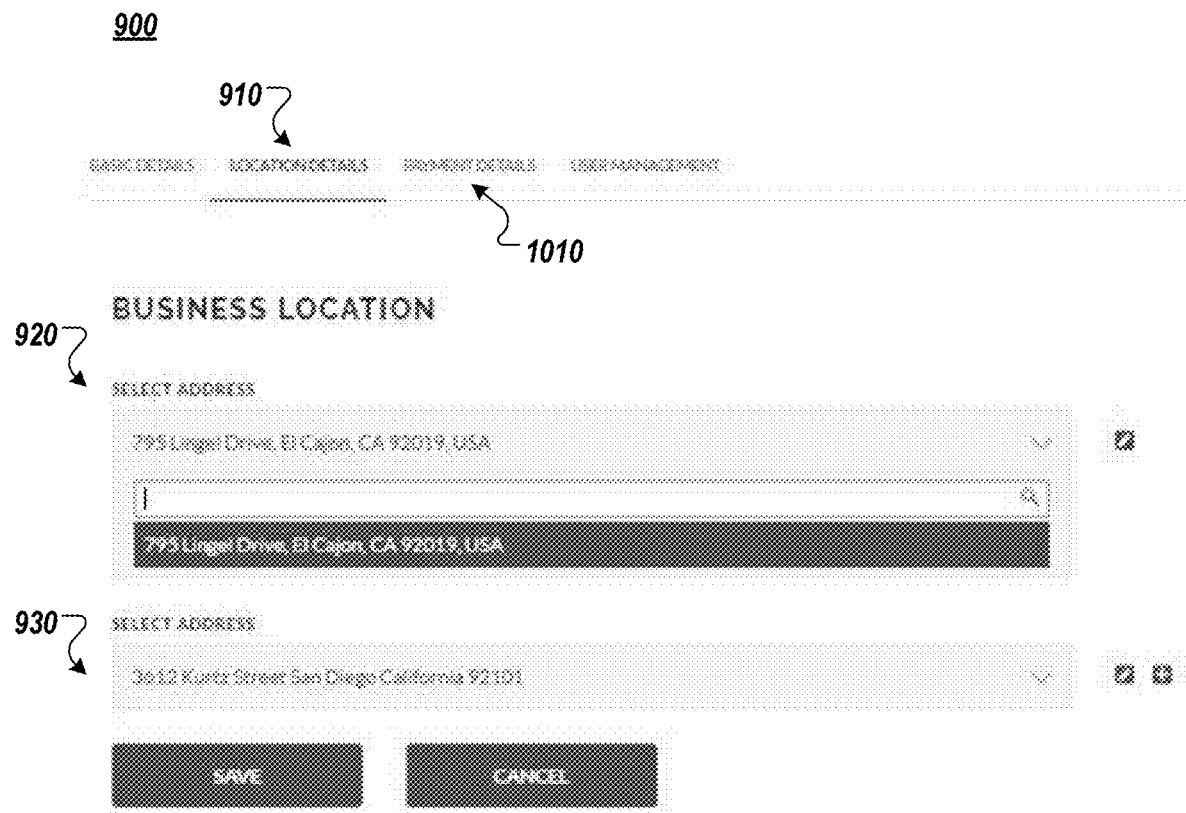
FIG. 9 illustrates an example location details interface in accordance with some example implementations of the present application.

FIG. 9 illustrates an example location details interface in accordance with some example implementations of the present application. An example registration interface for gathering location details 910 can be associated with any profile type, such as a dealer profile. The transporter application allows a user to store several locations associated with their profile. For a sample, business location 920, a preferred pickup location, a preferred drop-off location, a preferred billing address, etc. The transporter application can interface with external address for dictation sources to identify incorrect addresses, identify typos, suggest addresses, auto completes, etc. For example, a user type may register location details 920 store one or more dealer branch locations, storage locations, vehicle processing locations, manufacturer location, etc. For example, a transporter user type may register location details 910 to store a home location, a truck location, a preferred destination location, etc. For example, an auction house user type may register location details 9102 store a showroom location, a storage location, a vehicle processing location, a maintenance location, etc.

Figure 10:
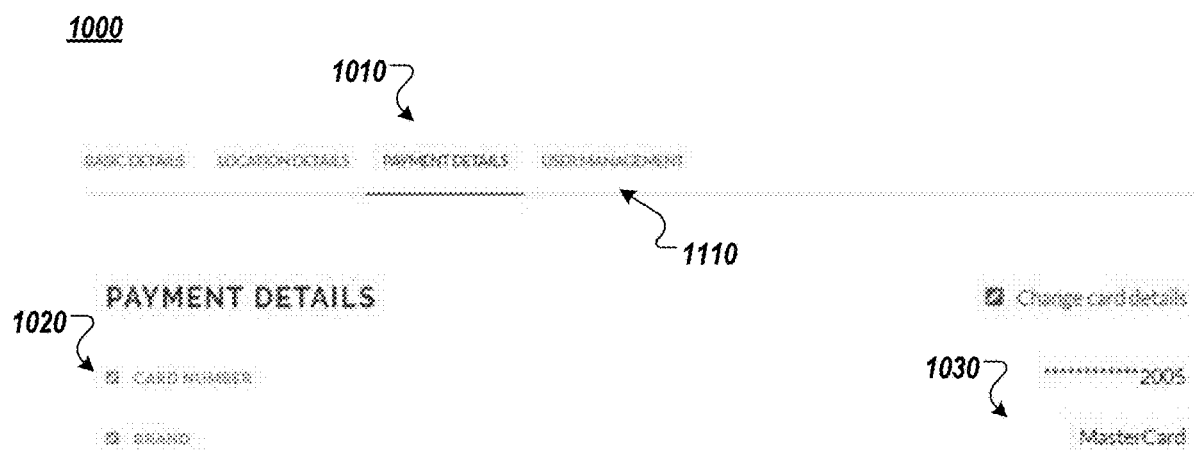
FIG. 10 illustrates an example payment details interface in accordance with some example implementations of the present application.

FIG. 10 illustrates an example payment details interface in accordance with some example implementations of the present application. An example registration interface for gathering payment details 1010 can be associated with any profile type, such as a dealer. The transporter application can facilitate payments between parties to an order. Payment details 1010 registration category can be used to store credit card information 1020, account information, deposit account information, online payment services, etc. associated with a user for any profile type.

Information registered under payment details 1010 registration category can be used, for example, by dealers to pay auction houses, auction houses to pay dealers, dealers to pay transporters, auction houses to pay transporters, or any combination of user types. In some implementations, the payment details 1010 registration category can be associated with a third-party payment service, such as, an online person-to-person payment service, a credit card service, an Internet banking service, etc.

Figure 11:
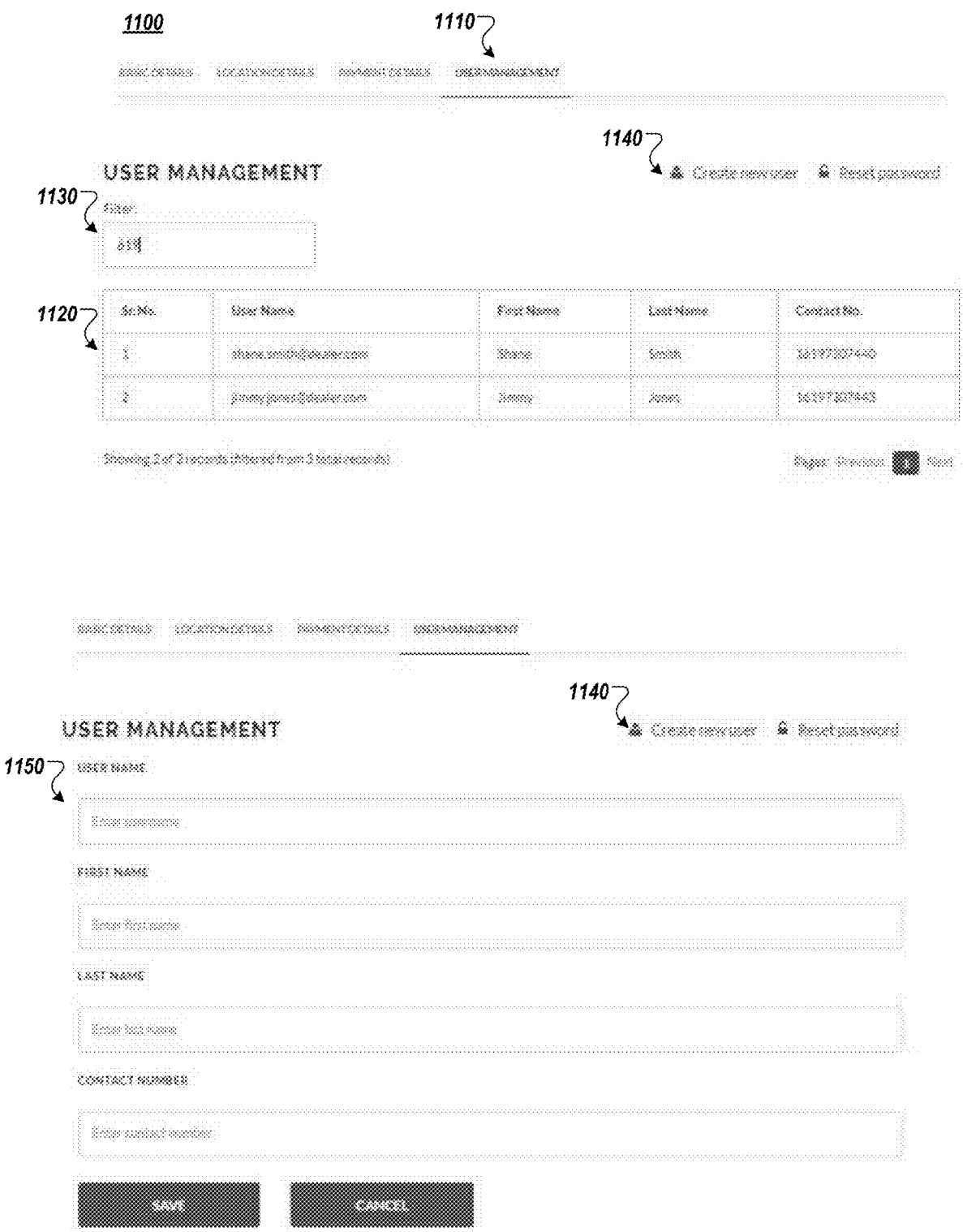
FIG. 11 illustrates an example user management interface in accordance with some example implementations of the present application.

FIG. 11 illustrates an example user management interface in accordance with some example implementations of the present application. In FIG. 11, an example registration interface for gathering user management details 1110. User management details can be used by a user to associate one or more rational profiles of the transporter application. The user sentiment details 1110 can also be used to users to the user profile without creating additional user profiles. For example, a dealer can register users under their profile for employees of the dealership. In another example, a transporter service can register a single transporter user profile and manage additional users for each driver associated with the transporter service without creating registering a user profile for each driver. The user management details 1110 allow a registered user's profile details to be used for additional managed users.

At 1120, a list of associated users can be managed, i.e., add, delete, modify, associated, unassociated, etc. an example interface can include user management controls, such as, a create new user 1140 feature, a reset password feature, a user search feature 1130, etc. in some implementations, a user can input sub-user details 1150 to create new users 1140. In some implementations, the registration interface can identify company details 830 associated with a previously registered company and pre-populate one or more registration interfaces with information from the previously registered company. For example in an employee of the dealership that register after the dealership owner previously registered may have location details, payment details, user management details, or other registration categories pre-populated, read-only, or restricted.

Figure 12:
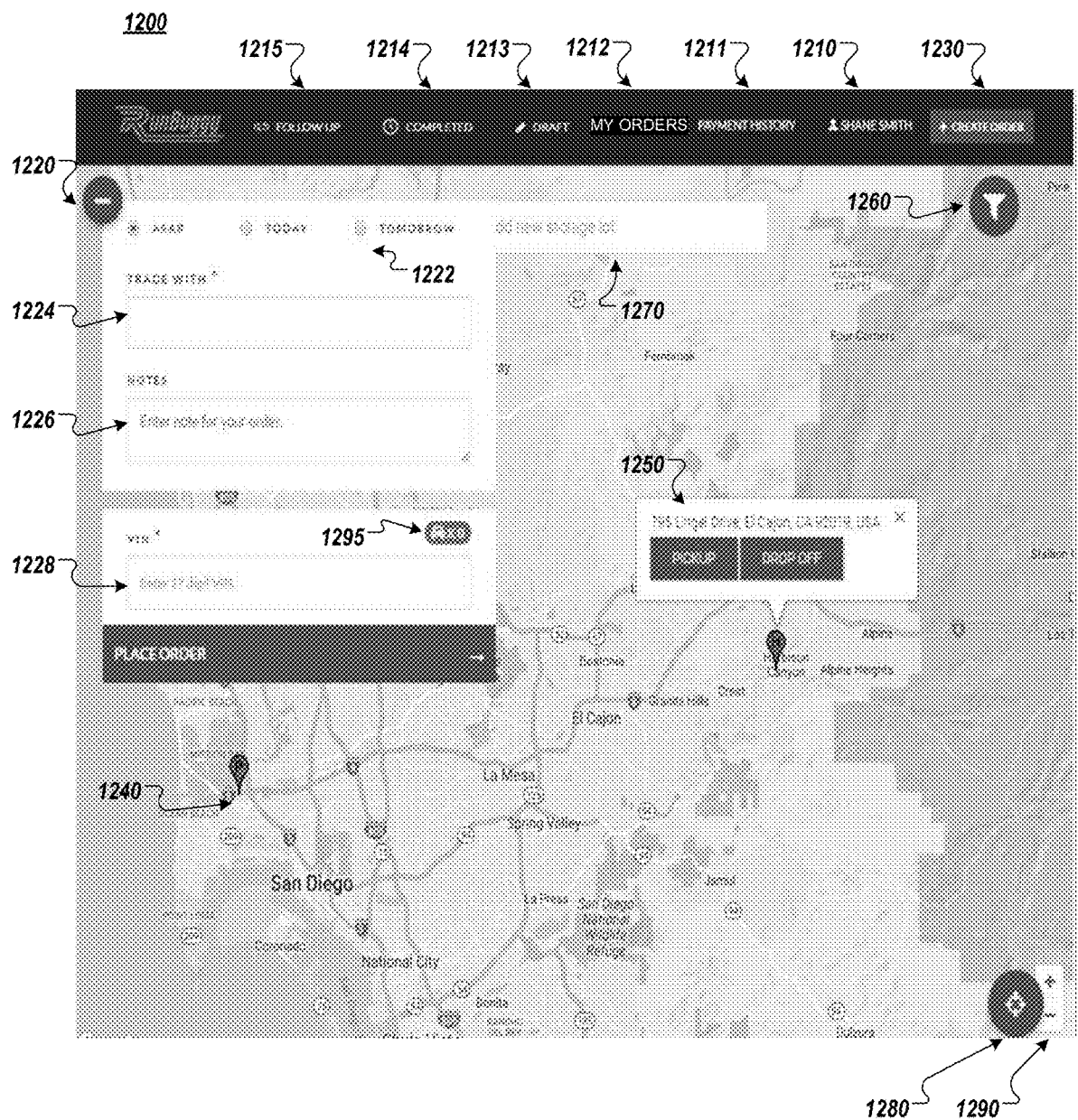
FIG. 12 illustrates an example dealer map interface in accordance with some example implementations of the present application.

FIG. 12 illustrates an example dealer map interface in accordance with some example implementations of the present application. In FIG. 12, an example map load board interface 1200 can be customized based on user profile type. The map load board interface 1200 can include various navigation and control options 1210-1230. In an example, a user profile menu 1210, a payment history menu 1211, a my orders menu 1212, a draft orders menu 1213, a completed orders menu 1214, a follow-up menu 1215, etc. The map load board interface 1200 can also include additional subinterfaces, such as, an expandable order navigation widget 1260 that displays options to create an order 1360, modify an order 1361, or follow-up on an order 1362. The map load board interface 1200 is customized based on user profile types to selectively present information to the user regarding transport options, allow the user to interactively input selections, receive the user input for various operations, and communicate messages or alerts. Example operations via the map load board interface 1200 include a create order sub-interface 1220-1295, an add storage location input 1270, location selection sub-interfaces 1240 and 1250, as well as, tracking capabilities as depicted in greater details in FIGS. 13, 14, and 16.

Figure 13:
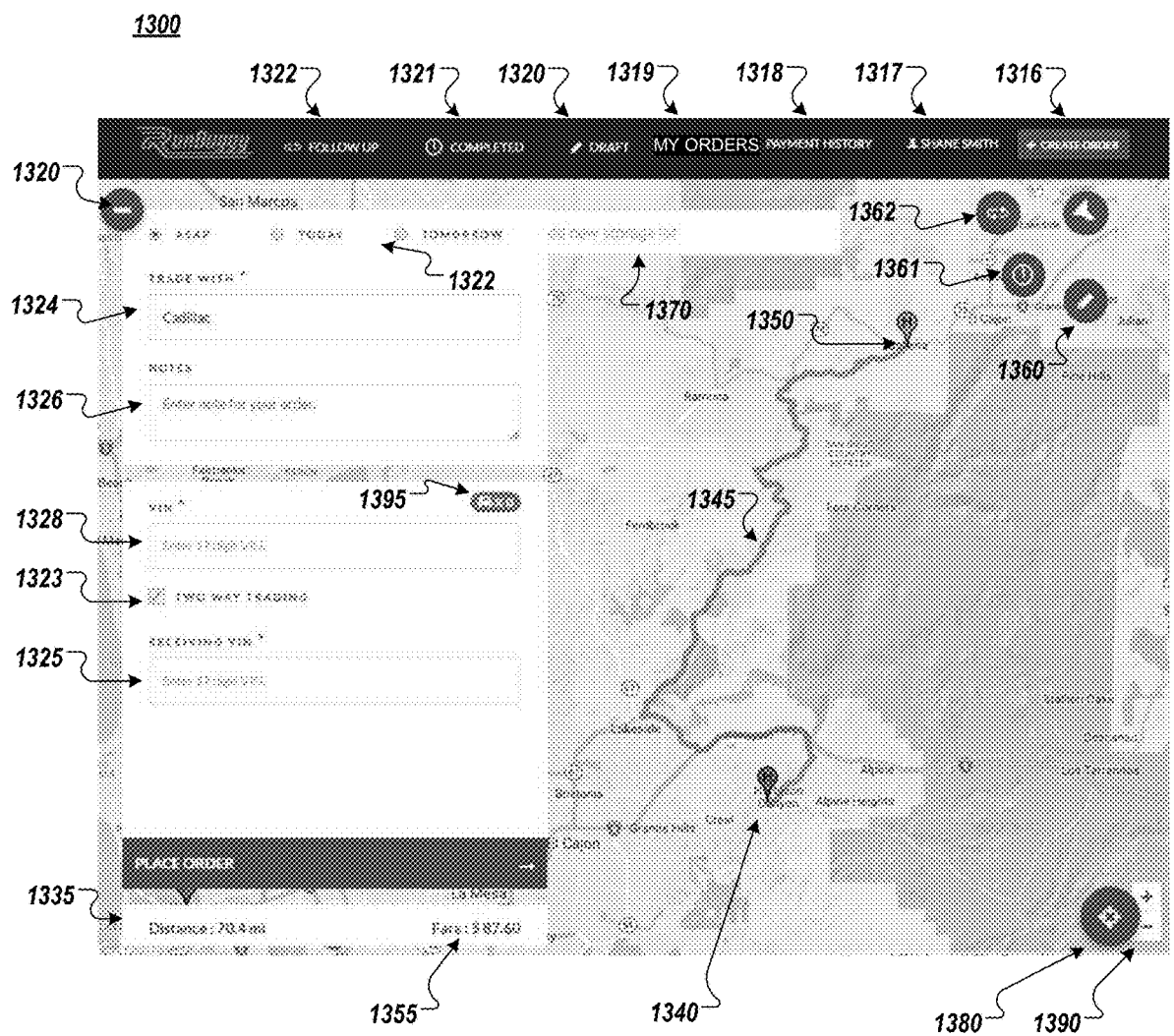
FIG. 13 illustrates an example dealer order placement interface in accordance with some example implementations of the present application.
Figure 14:
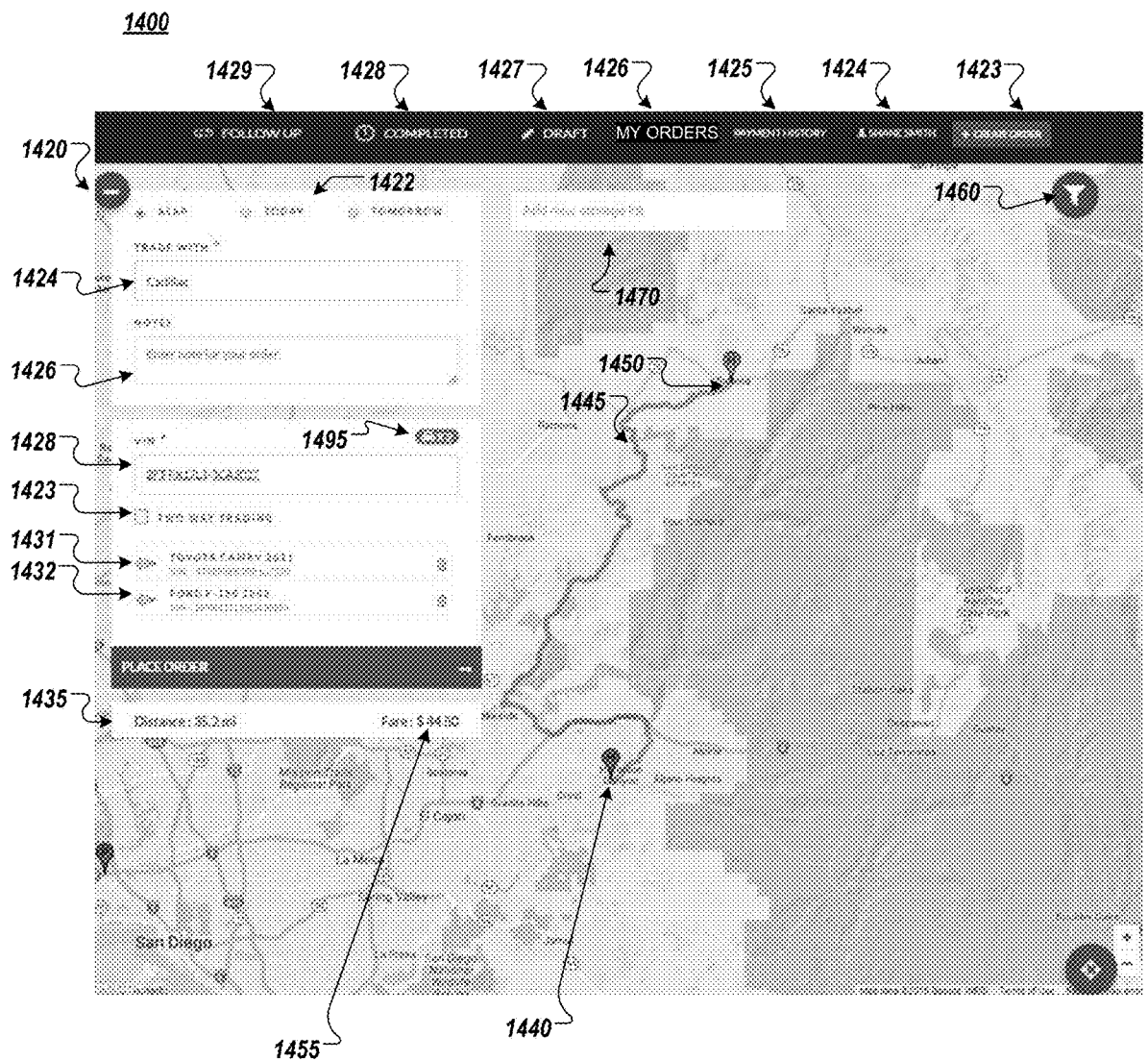
FIG. 14 illustrates an example dealer order placement interface in accordance with some example implementations of the present application.
Figure 19:
FIG. 19 illustrates an example dealer map interface in accordance with some example implementations of the present application.
Figure 20:
FIG. 20 illustrates an example transporter profile interface in accordance with some example implementations of the present application.
Figure 21:
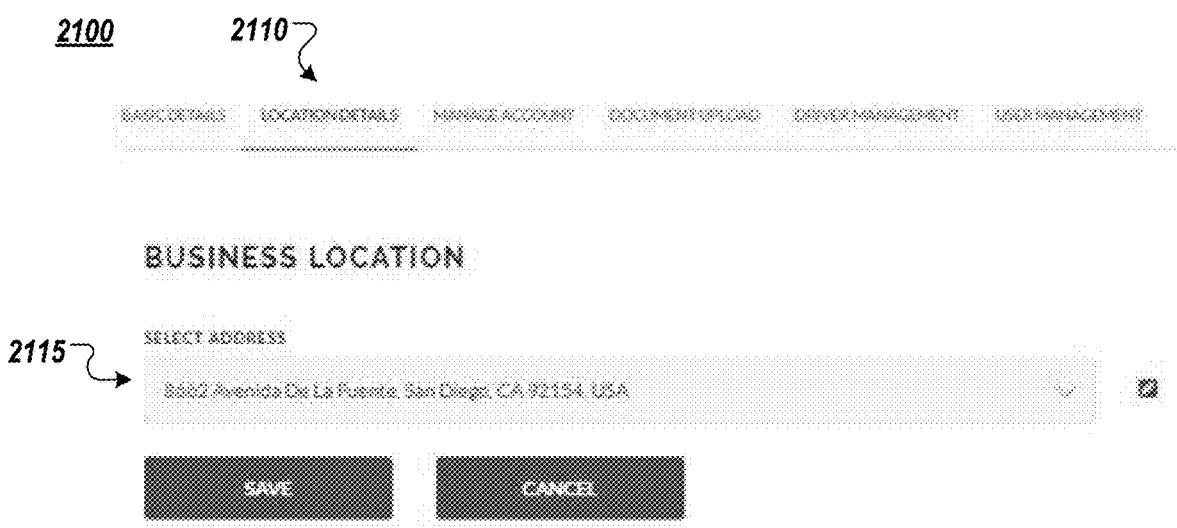
FIG. 21 illustrates an example location details interface in accordance with some example implementations of the present application.
Figure 23:
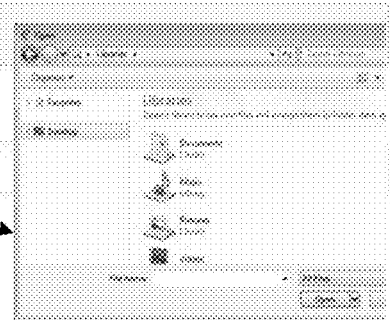
FIG. 23 illustrates an example transporter registration interface in accordance with some example implementations of the present application.
Figure 25:
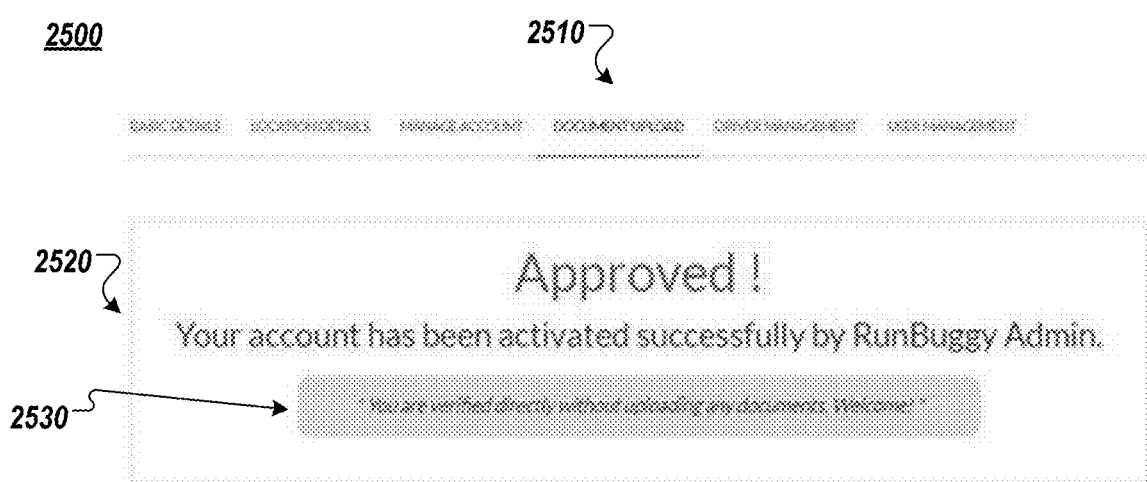
FIG. 25 illustrates an example document verification interface in accordance with some example implementations of the present application.
Figure 26:
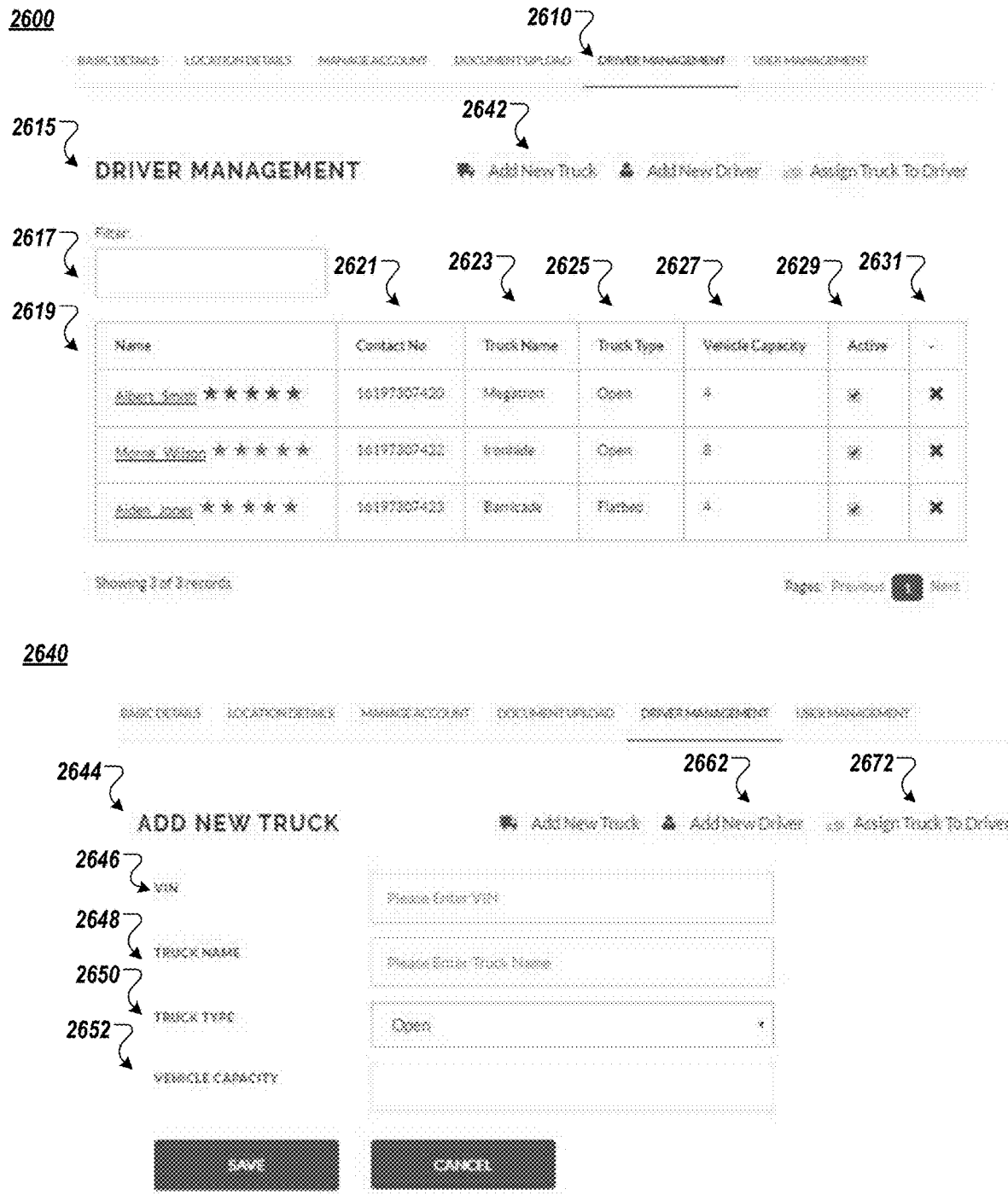
FIG. 26 illustrates example driver management interfaces in accordance with some example implementations of the present application.
Figure 29:
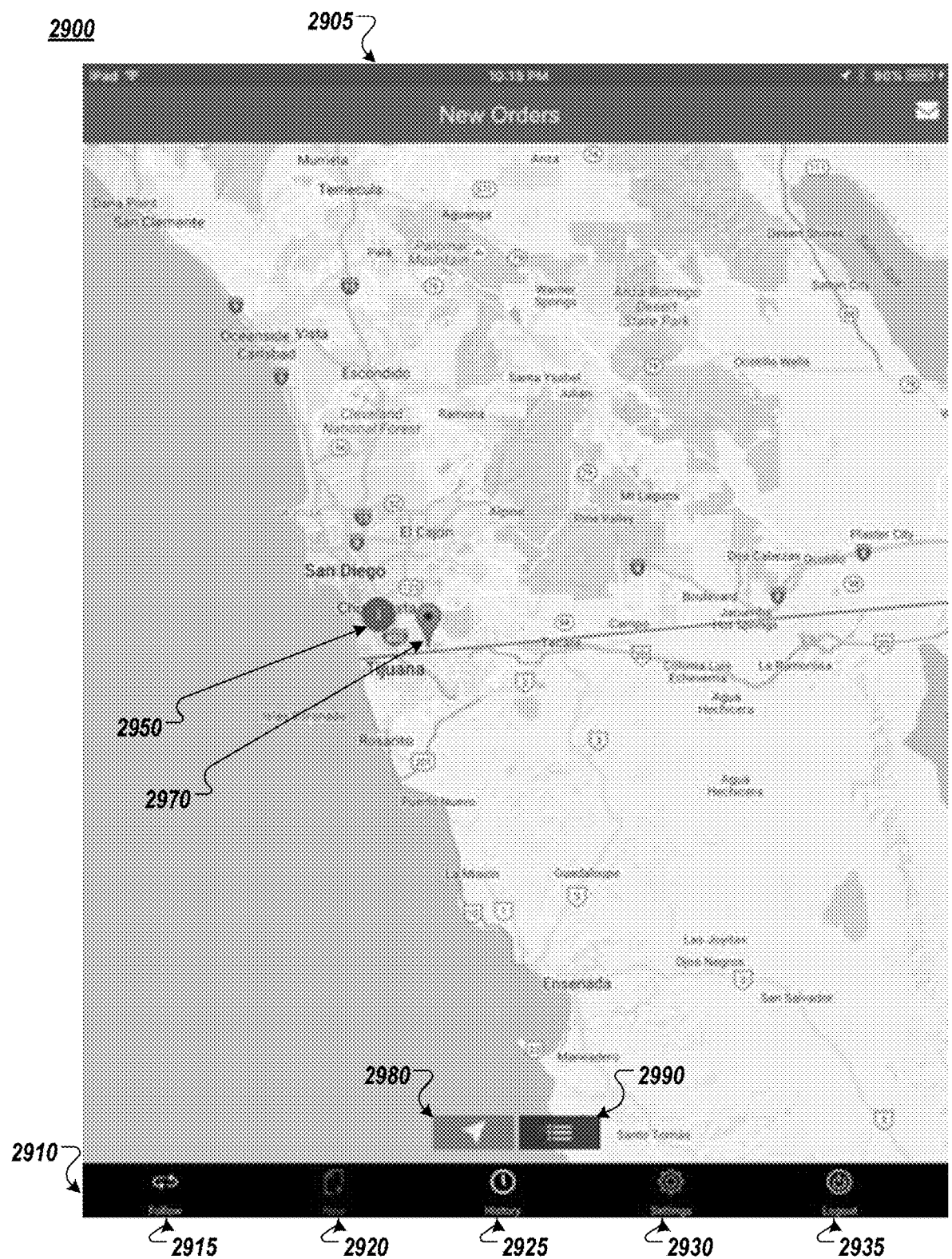
FIG. 29 illustrates an example transporter map interface in accordance with some example implementations of the present application.
Figure 30:
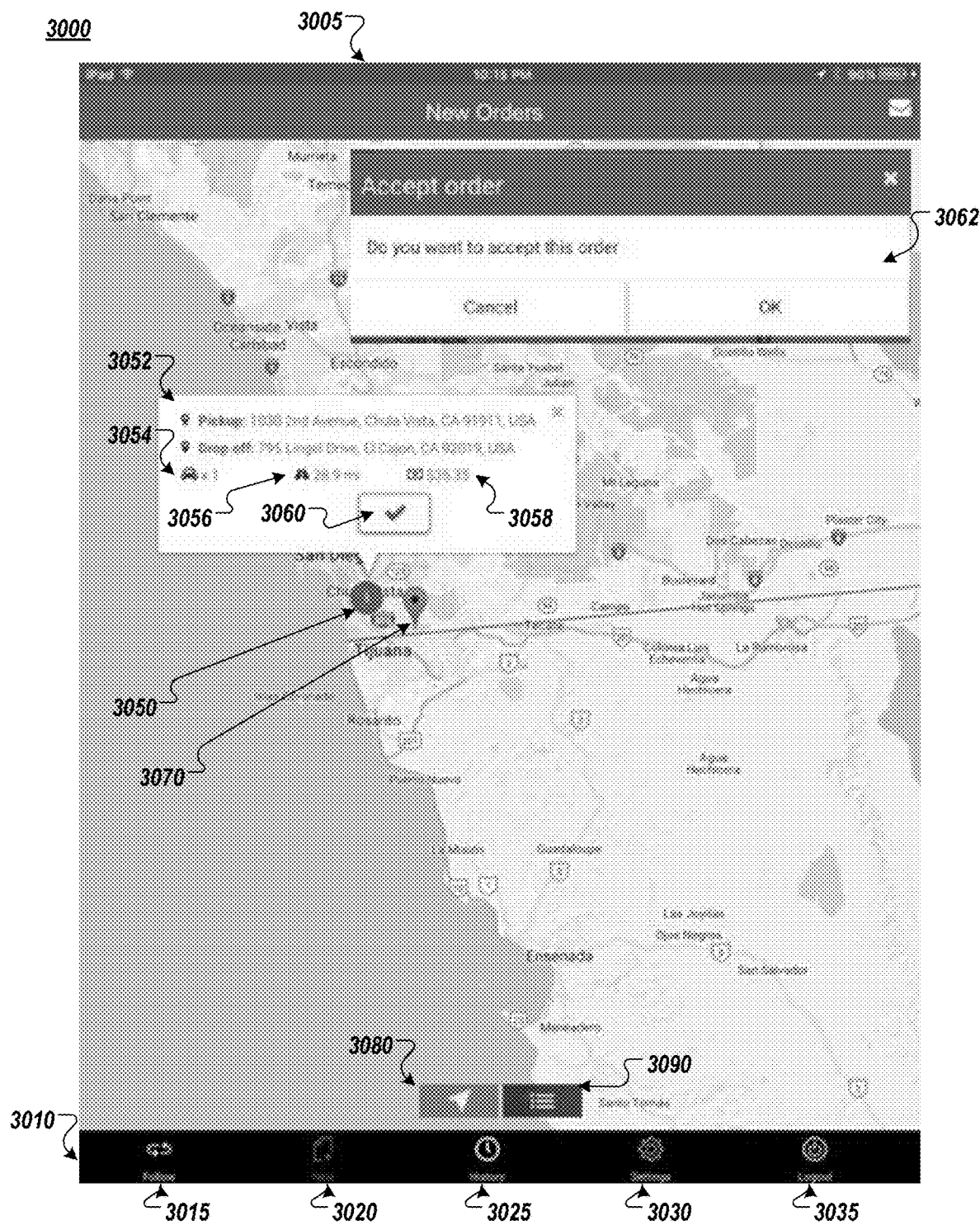
FIG. 30 illustrates an example transporter job interface in accordance with some example implementations of the present application.
Figure 33:
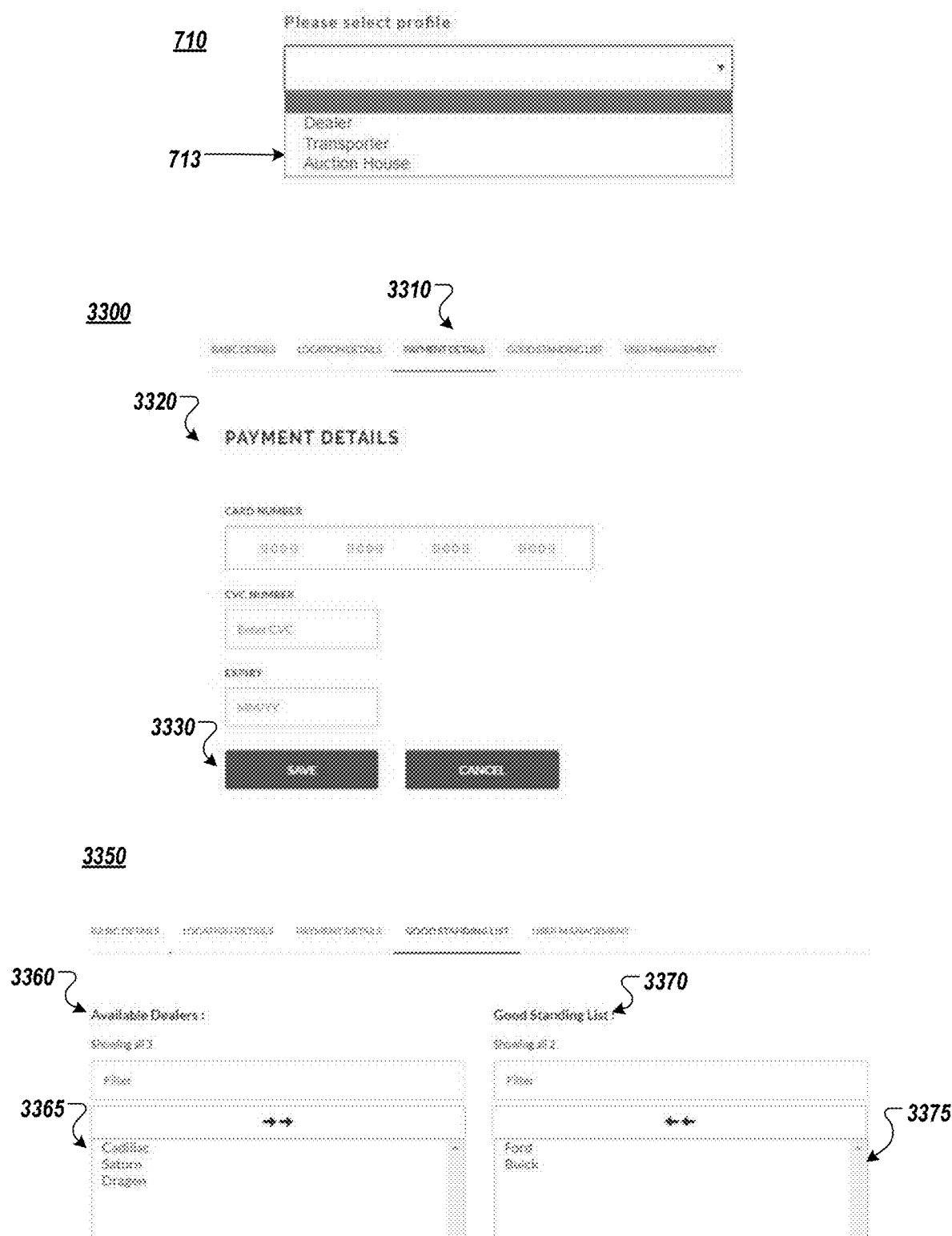
FIG. 33 illustrates example auction house interfaces in accordance with some example implementations of the present application.

FIG. 13 illustrates an example dealer order placement interface in accordance with some example implementations of the present application. The transporter application can connect with a map API to provide the map load board interface 1200 with a geographic depiction of an area relevant to orders, stored locations, or real-time user location 1280. The transporter application can send information from registered user information or other input, such as a mobile device, to the map API to receive the geographic depiction. The transporter application can add, overlay, or otherwise visually represent one or more points on the geographic depiction. For example the transporter application can add a pin, a pop-up balloon, a marking, etc. to associate a location on the map with information associated with a registered user, an order, toll booth, etc. The map load board interface 1200 can include additional sub-interfaces or commands to interact with the map API such as zoom 1290.

FIG. 17 illustrates example order detail interface 1700 in accordance with some example implementations of the present application. The transporter application updates the order details screen with associated activities. Basic details 1705 can be received from the user requesting the order (e.g., an order type), registered user profile information (e.g., a pick-up location), external sources (e.g., a map API to return a distance calculation). The order details interface 1700 can include the ability to add information, such as VIN numbers 1710 that are sent to an external source to retrieve vehicle details such as model, type, year, etc.

The order details interface 1700 includes a real-time order status 1715 that presents the user with updates of associated activities. Associated activities can reflect information from additional users working on the order. For example, the order status presented to the user that requested the order can update to reflect that a mobile device associated with the driver has arrived at the pick-up location (e.g., a GPS signal, message from the driver, etc.).

The transporter application enables the driver to upload media (e.g., pictures 1760a-1760n, video, a VIN scan, etc.) via their mobile device and associate verification information, such as a timestamp, GPS location, second person verification, etc. The uploaded media can be presented to other users via the order details interface 1700 for each vehicle asset 1755, 1770 of the order to verify the condition of the vehicle when the driver takes possession as well as at time of delivery 1775, 1875a-1875n.

FIGS. 18-27 show example interfaces for a transporter user type in accordance with some example implementations of the present application. The transporter application can make arrangement to supply drivers on demand to driver transport vehicles to new locations, as well as, arrange a ride for the driver to the next location. For example, the transporter application can arrange a trip back for the driver to the original location for large orders by using one of the drivers on a two way trip.

In an example implementation, an order can be placed to transport the vehicle where the transporter is authorized to drive the vehicle rather than a truck. The transporter application allows requesting parties to hire just drivers to move cars. Users can register as a driver only rather than associated with a tuck. This allows the driver to go to the dealership or auction (in driver's own car or take a bus, a ride share, etc.), get driver the car that needs to be moved and deliver it. In some cases drivers can be hired two at a time and take a chase car or use a ride-sharing service to get between locations of the car to be moved. The requesting party (i.e., the dealer) can request additional insurance or bonding, as well as, additional background and driving record checks.

An order to request transport of one or more vehicles can have two or more drivers requested for the order. For example, a dealer can request 2 drivers to transport vehicles, where after a first vehicle is delivered, the second driver returns the driver to the original pickup location to deliver the next vehicle. That is, the number of transporters/drivers can be less than, equal to, or greater than the number of vehicles. Using an additional driver with a chase vehicle allows fewer drivers to transport multiple cars between locations. In some cases, drivers can use one of the vehicles to be delivered as a chase car to transport drivers to the next pickup location associated with the order.

A transporter registers according to the process described in FIGS. 20-28. Referring to FIG. 27, a driver 2719 can be assigned a truck type 2723 called DRIVE TRANSPORT VEHICLE (not shown). A requesting party (dealer/auction house) can place an order that authorizes DRIVE VEHICLE TO TRANSPORT or both parties agree for trades. In this example, a driver assigned to truck type DRIVE TRANSPORT VEHICLE can be offered, for example FIGS. 29-31, jobs where the requesting party authorizes the driver to drive the vehicle associated with the VIN on the order.

When a DRIVE TRANSPORT VEHICLE order is confirmed with a transporter, the transport application on the driver's mobile device can optionally launch a ride sharing application. For example, a driver without a truck can use a ride share to get to the pickup location. Additionally, the transport application can include functionality to transfer a ride share bill to the transporter application for payment processing by an account registered with the transport application. The transport application can share the mobile device's GPS information and communicate an estimate time of arrival at the pickup location.

Prior to departing the pickup location, the transport application can also collect, via the driver's mobile device an odometer photo to evidence the car mileage prior to departure. Additionally, a registered user (the driver or someone other than driver) at the pickup location can capture a picture of the driver at the pickup location to evidence the driver prior to departure. The driver's pickup location picture can be uploaded to the transport application with a timestamp and GPS information.

During transit, the transport application can gather the driver's GPS information and provide the vehicle's location on a map, for example FIG. 16, to registered users associated with the transport job. In some implementations, the transport application can also use the GPS information to track excessive speeding by the driver and gather dash mounted camera video via the driver's mobile device in a mounted position.

When the driver without a truck completes one or more jobs, the transporter application can recommend additional DRIVE TRANSPORT VEHICLE orders from the delivery location or area. For example, where two or more vehicles are swapped between two locations, the driver can pick up a first vehicle, drive the vehicle to a first delivery location, and drive a second vehicle from the first delivery location to a second delivery location that may be the same or different location as the first pickup location. Additionally, the transport application can launch the ride sharing application for the driver to get a ride from a last delivery location.

Figure 35:
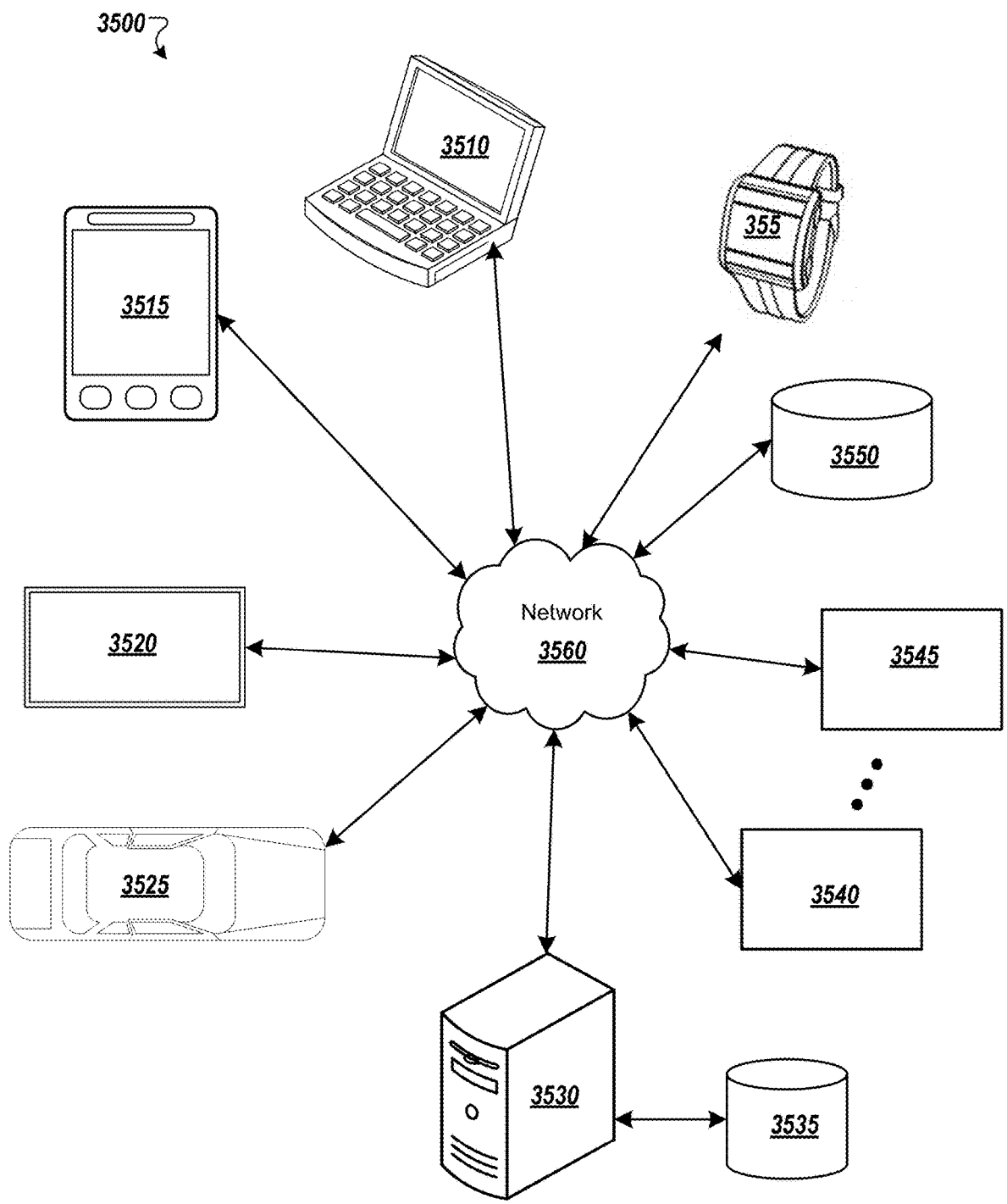
FIG. 35 shows an example environment suitable for some example implementations of the present application.

FIG. 35 shows an example environment suitable for some example implementations of the present application. Environment 3500 includes devices 3510-3555, and each is communicatively connected to at least one other device via, for example, network 3560 (e.g., by wired and/or wireless connections). Some devices may be communicatively connected to one or more storage devices 3535 and 3550.

An example of one or more devices 3510-3555 may be computing device 3505 described below in FIG. 36. Devices 3510-3555 may include, but are not limited to, a computer 3510 (e.g., a laptop computing device), a mobile device 3515 (e.g., smartphone or tablet), a television 3520, a device associated with a vehicle 3525, a server computer 3530, computing devices 3540-3545, storage devices 3535 and 3550 and wearable device 3555.

In some implementations, devices 3510-3525 and 3555 may be considered user devices (e.g., devices used by users to access the transporter platform, post needs, reply to needs posted by others, choose winning recommendations, and award prizes). Devices 3530-3550 may be devices associated with the transporter platform to review and interact with user postings and provide distribution of posted needs, and track winning recommendations and awarded prizes.

For example, a user (e.g., Alice) may access the transporter platform, post a need, and review replies received to the posted need using user device 3510 or 3515 on the transporter platform supported by one or more devices 3530-3550. Further, another user ("recipient user"; e.g., Bob) may access and/or view Alice's posted need and submit a reply or recommendation using user device 3520, 3525, or 3555. Both owner and recipient user may receive push notifications regarding published needs, responses, and other activities.

Figure 36:
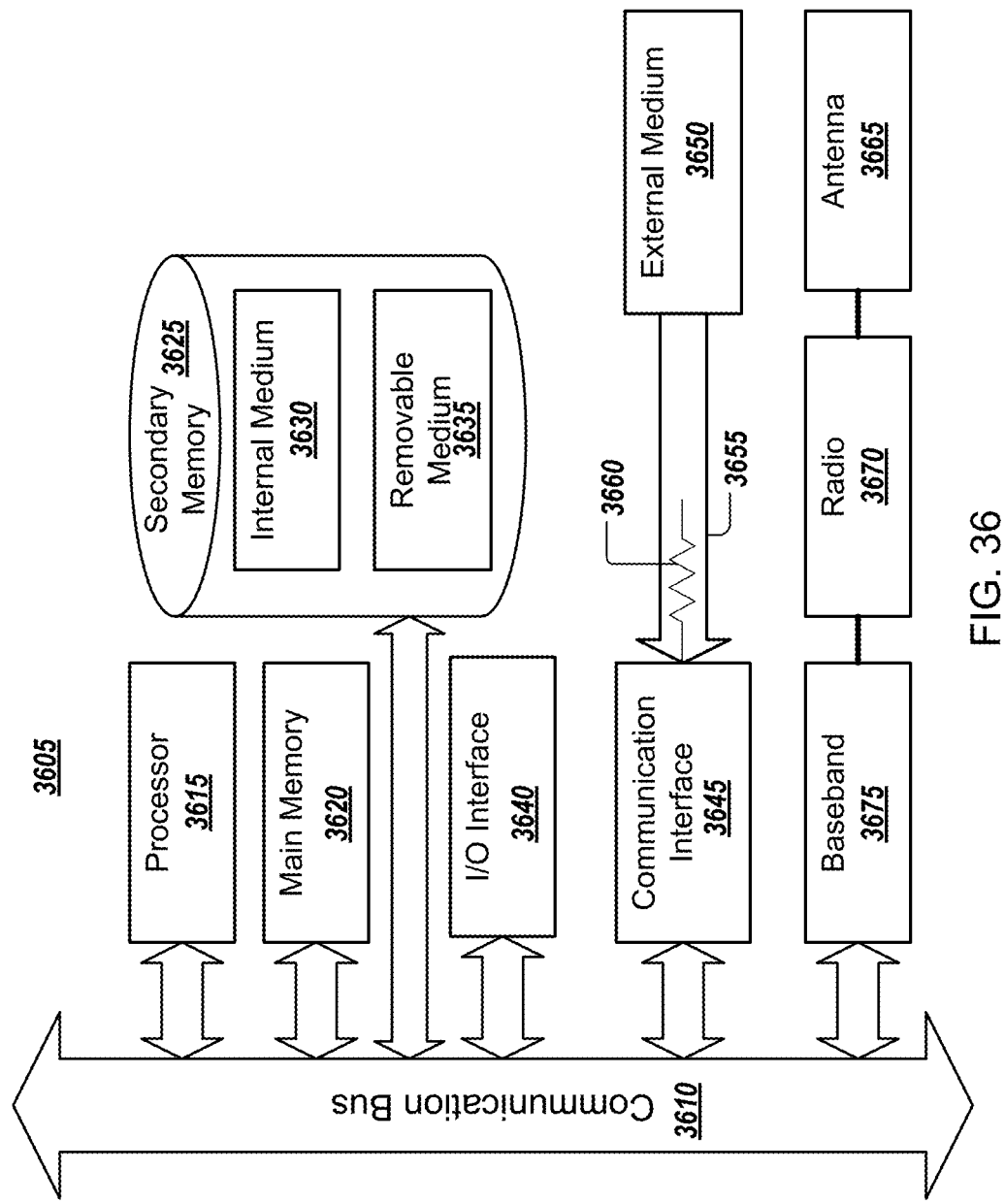
FIG. 36 provides a block diagram illustrating an example computing device or system that may be used in connection with various implementations described herein.

FIG. 36 provides a block diagram illustrating an example computing device or system that may be used in connection with various implementations described herein. For example the system 3605 may be used as or in conjunction with one or more of the mechanisms or processes described above and may represent components of processors, user system(s), and/or other devices described herein. The system 3605 can be a server or any conventional personal computer, or any other processor-enabled device that is capable of wired or wireless data communication. Other computer systems and/or architectures may be also used, as will be clear to those skilled in the art.

The system 3605 preferably includes one or more processors, such as processor 3615. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 3615. Examples of processors which may be used with system 3605 include, without limitation, the Pentium® processor, Core i7® processor, and Xeon® processor, all of which are available from Intel Corporation of Santa Clara, Calif.

The processor 3615 is preferably connected to a communication bus 3610. The communication bus 3610 may include a data channel for facilitating information transfer between storage and other peripheral components of the system 3610. The communication bus 3610 further may provide a set of signals used for communication with the processor 3615, including a data bus, address bus, and control bus (not shown). The communication bus 3610 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 3688 general-purpose interface bus (GPIB), IEEE 696/S-30, and the like.

System 3605 preferably includes a main memory 3620 and may also include a secondary memory 3625. The main memory 3620 provides storage of instructions and data for programs executing on the processor 3615, such as one or more of the functions and/or modules discussed above. It should be understood that programs stored in the memory and executed by processor 3615 may be written and/or compiled according to any suitable language, including without limitation C/C++, Java, JavaScript, Pearl, Visual Basic, .NET, and the like. The main memory 3620 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 3625 may optionally include an internal memory 3630 and/or a removable medium 3635, for example a floppy disk drive, a magnetic tape drive, a compact disc (CD) drive, a digital versatile disc (DVD) drive, other optical drive, a flash memory drive, etc. The removable medium 3635 is read from and/or written to in a well-known manner. Removable storage medium 3635 may be, for example, a floppy disk, magnetic tape, CD, DVD, SD card, etc.

The removable storage medium 3635 is a non-transitory computer-readable medium having stored thereon computer executable code (i.e., software) and/or data. The computer software or data stored on the removable storage medium 3635 is read into the system 3605 for execution by the processor 3615.

In alternative implementations, secondary memory 3625 may include other similar means for allowing computer programs or other data or instructions to be loaded into the system 3605. Such means may include, for example, an external storage medium 3650 and an interface 3645. Examples of external storage medium 3650 may include an external hard disk drive or an external optical drive, or and external magneto-optical drive.

Other examples of secondary memory 3625 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 3635 and communication interface 3645, which allow software and data to be transferred from an external medium 3650 to the system 3605.

System 3605 may include a communication interface 3645. The communication interface 3645 allows software and data to be transferred between system 3605 and external devices (e.g. printers), networks, or information sources. For example, computer software or executable code may be transferred to system 3605 from a network server via communication interface 3645. Examples of communication interface 3645 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 3605 with a network or another computing device.

Communication interface 3645 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 3645 are generally in the form of electrical communication signals 3660. These signals 3660 are preferably provided to communication interface 3645 via a communication channel 3655. In one implementation, the communication channel 3655 may be a wired or wireless network, or any variety of other communication links. Communication channel 3655 carries signals 3660 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 3620 and/or the secondary memory 3625. Computer programs can also be received via communication interface 3645 and stored in the main memory 3620 and/or the secondary memory 3625. Such computer programs, when executed, enable the system 3605 to perform the various functions of the present invention as previously described.

In this description, the term "computer readable medium" is used to refer to any non-transitory computer readable storage media used to provide computer executable code (e.g., software and computer programs) to the system 3605. Examples of these media include main memory 3620, secondary memory 3625 (including internal memory 3630, removable medium 3635, and external storage medium 3650), and any peripheral device communicatively coupled with communication interface 3645 (including a network information server or other network device). These non-transitory computer readable mediums are means for providing executable code, programming instructions, and software to the system 3605.

In an implementation that is implemented using software, the software may be stored on a computer readable medium and loaded into the system 3605 by way of removable medium 3635, I/O interface 3640, or communication interface 3645. In such an implementation, the software is loaded into the system 3605 in the form of electrical communication signals 3660. The software, when executed by the processor 3615, preferably causes the processor 3615 to perform the inventive features and functions previously described herein.

In an implementation, I/O interface 3640 provides an interface between one or more components of system 3605 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 3605 also includes optional wireless communication components that facilitate wireless communication over a voice and over a data network. The wireless communication components comprise an antenna system 3665, a radio system 3670, and a baseband system 3675. In the system 3605, radio frequency (RF) signals are transmitted and received over the air by the antenna system 3665 under the management of the radio system 3670.

In one implementation, the antenna system 3665 may comprise one or more antennae and one or more multiplexors (not shown) that perform a switching function to provide the antenna system 3665 with transmit and receive signal paths. In the receive path, received RF signals can be coupled from a multiplexor to a low noise amplifier (not shown) that amplifies the received RF signal and sends the amplified signal to the radio system 3670.

In alternative implementations, the radio system 3670 may comprise one or more radios that are configured to communicate over various frequencies. In one implementation, the radio system 3670 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 3670 to the baseband system 3675.

If the received signal contains audio information, then baseband system 3675 decodes the signal and converts it to an analog signal. Then the signal is amplified and sent to a speaker. The baseband system 3675 also receives analog audio signals from a microphone. These analog audio signals are converted to digital signals and encoded by the baseband system 3675. The baseband system 3675 also codes the digital signals for transmission and generates a baseband transmit audio signal that is routed to the modulator portion of the radio system 3670. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 3665 where the signal is switched to the antenna port for transmission.

The baseband system 3675 is also communicatively coupled with the processor 3615. The central processing unit 3615 has access to data storage areas 3620 and 3625. The central processing unit 3615 is preferably configured to execute instructions (i.e., computer programs or software) that can be stored in the memory 3620 or the secondary memory 3625. Computer programs can also be received from the baseband processor 3665 and stored in the data storage area 3620 or in secondary memory 3625, or executed upon receipt. Such computer programs, when executed, enable the system 3605 to perform the various functions of the present invention as previously described.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

According to an example implementation, a method for managing transport services includes receiving, by a processing device, a request for vehicle transport comprising order details including a vehicle identification number (VIN) from a requesting party; requesting vehicle details in view of the VIN; validating one or more of the order details in view of user profile information; determining a transport fee in view of the order details and vehicle details; generating a transport request comprising the transport fee and map information based on the order details; providing the transport request to one or more transport parties for display with a map interface; receiving from a transport party acceptance of the transport request and a mobile device associated with a driver for the vehicle transport; and transmitting, to the requesting party, GPS information of the mobile device during transport of the vehicle.

What is claimed is:

1. A method comprising:
    receiving, via a processing device, availability information and location information indicated by a mobile device associated with a driver, the mobile device being configured to communicate with the processing device over a wireless communication channel;
    identifying, by the processing device, a set of vehicle transport orders that are compatible with the availability information and the location information indicated by the mobile device;
    analyzing a load repository to calculate a load board matching score;
    calculating a driver suitability score for each vehicle transport order in the set of vehicle transport orders based on the load board matching score;
    determining a fee for each vehicle transport order in the set of vehicle transport orders based at least on the driver suitability score;
    wirelessly transmitting, by the processing device, information associated with at least one of the set of vehicle transport orders, the fee for each vehicle transport order, or corresponding order parameters via an interface with the mobile device; and
    wirelessly transmitting updated information associated with at least one of the set of vehicle transport orders, the fee for each vehicle transport order, or the corresponding order parameters based on real-time information received by the processing device.

2. The method of claim 1, wherein the load board matching score is based on a user supply in view of a transport demand for a time associated with the availability information and one or more transport locations associated with the location information indicated by the mobile device.

3. The method of claim 2, wherein the user supply is based on analyzing user information of other drivers for the one or more transport locations, wherein user information comprises schedules, projected schedules, vehicle transport capacities, predicted vehicle transport capacities, route preferences, or past behaviors; and
    wherein the transport demand is based on analyzing transport schedules for the one or more transport locations, wherein transport schedules comprise at least one of placed vehicle transport orders, parameters of placed vehicle transport orders, projected vehicle transport orders, or predicted parameters of projected vehicle transport orders during times associated with the availability information indicated by the mobile device.

4. The method of claim 1, wherein the calculating the driver suitability score for each vehicle transport order comprises:
    identifying a set of users with user information that satisfies a set of vehicle transport order parameters for the vehicle transport order in view of the calculated load board matching score, wherein user information comprises at least one of schedules, projected schedules, vehicle transport capacities, predicted vehicle transport capacities, route preferences, or past behaviors of other drivers; and
    determining the driver suitability score based on the set of users and the availability information of the driver indicated by the mobile device.

5. The method of claim 1, wherein the identifying the set of vehicle transport orders that are compatible with the availability information and the location indicated by the mobile device information comprises
    analyzing projected traffic data associated with the set of vehicle transport orders to determine a ranked list of vehicle transport orders.

6. The method of claim 1, wherein the availability information is associated with a transporter truck load capacity, predicted load capacity, load weight limit, dimensions, or other transporter truck limits indicated by the mobile device.

7. The method of claim 1, wherein the location information comprises at least one of a current location, a destination location, a scheduled location, or past location history.

8. The method of claim 7, wherein the current location, the destination location, the scheduled location, or the past location history comprises a geographic region, a sub-region, an address, or any address coordinates indicated by the mobile device.

9. The method of claim 1, further comprising,
    receiving updated location information from the mobile device; and
    updating the set of vehicle transport orders based, at least in part, on the updated location information.

10. The method of claim 1, further comprising,
    receiving updated vehicle transport order information; and
    updating the set of vehicle transport orders based, at least in part, on the updated vehicle transport order information.

11. The method of claim 1, further comprising, receiving a selected vehicle transport order from the set of vehicle transport orders; and
    sending the order parameters with driving directions to a start location for the selected vehicle transport order;
    sending tracking information for a location of the mobile device;
    recording a timestamp in response to the location of the mobile device matching the start location,
    receiving one or more images of a vehicle; and
    generating a report.

12. A system comprising:
    a memory; and
    at least one processor coupled to the memory and configured to:
        receive, via the at least one processor, availability information and location information indicated by a mobile device associated with a driver, the mobile device being configured to communicate with the system over a wireless communication channel;
        identify, by the at least one processor, a set of vehicle transport orders that are compatible with the availability information and the location information indicated by the mobile device;
        analyze a load repository to calculate a load board matching score;
        calculate a driver suitability score for each vehicle transport order in the set of vehicle transport orders based on the load board matching score;
        determine a fee for each vehicle transport order in the set of vehicle transport orders based at least on the driver suitability score;
        wirelessly transmit, by the at least one processor, information associated with at least one of the set of vehicle transport orders, the fee for each vehicle transport order, or corresponding order parameters via an interface with the mobile device; and wirelessly transmit updated information associated with at least one of the set of vehicle transport orders, the fee for each vehicle transport order, or the corresponding order parameters based on real-time information received by the at least one processor.

13. The system of claim 12, wherein the load board matching score is based on a user supply in view of a transport demand for a time associated with the availability information and one or more transport locations associated with the location information indicated by the mobile device.

14. The system of claim 13, wherein the user supply is based on analyzing user information of other drivers for the one or more transport locations, wherein user information comprises schedules, projected schedules, vehicle transport capacities, predicted vehicle transport capacities, route preferences, or past behaviors; and wherein the transport demand is based on analyzing transport schedules for the one or more transport locations, wherein transport schedules comprise at least one of placed vehicle transport orders, parameters of placed vehicle transport orders, projected vehicle transport orders, or predicted parameters of projected vehicle transport orders during times associated with the availability information indicated by the mobile device.

15. The system of claim 12, wherein the calculation of the driver suitability score for each vehicle transport order comprises to:

identify a set of users with user information that satisfies a set of vehicle transport order parameters for the vehicle transport order in view of the calculated load board matching score, wherein user information comprises at least one of schedules, projected schedules, vehicle transport capacities, predicted vehicle transport capacities, route preferences, or past behaviors of other drivers; and determine the driver suitability score based on the set of users and the availability information indicated by the mobile device.

16. The system of claim 12, wherein the identification of the set of vehicle transport orders that are compatible with the availability information and the location indicated by the mobile device information comprises to:

analyze projected traffic data associated with the set of vehicle transport orders to determine a ranked list of vehicle transport orders.

17. The system of claim 12, wherein the availability information is associated with a transporter truck load capacity, predicted load capacity, load weight limit, dimensions, or other transporter truck limits indicated by the mobile device.

18. The system of claim 12, wherein the location information comprises at least one of a current location, a destination location, a scheduled location, or past location history.

19. The system of claim 18, wherein the current location, the destination location, the scheduled location, or the past location history comprises a geographic region, a sub-region, an address, or any address coordinates indicated by the mobile device.

20. A non-transitory, computer-readable medium storing computer-executable code, the code, when executed by at least one processor, configured to cause the at least one processor to:

receive, via the at least one processor, availability information and location information indicated by a mobile device associated with a driver, the mobile device being configured to communicate with the system over a wireless communication channel;

identify, by the at least one processor, a set of vehicle transport orders that are compatible with the availability information and the location information indicated by the mobile device;

analyze a load repository to calculate a load board matching score;

calculate a driver suitability score for each vehicle transport order in the set of vehicle transport orders based on the load board matching score;

determine a fee for each vehicle transport order in the set of vehicle transport orders based at least on the driver suitability score;

wirelessly transmit, by the at least one processor, information associated with at least one of the set of vehicle transport orders, the fee for each vehicle transport order, or corresponding order parameters via an interface with the mobile device; and wirelessly transmit updated information associated with at least one of the set of vehicle transport orders, the fee for each vehicle transport order, or the corresponding order parameters based on real-time information received by the at least one processor.

* * * * *